(12) United States Patent
Yamamoto et al.

(10) Patent No.: US 11,681,412 B2
(45) Date of Patent: *Jun. 20, 2023

(54) USER INTERFACE MENU TRANSITIONS WITH SELECTABLE ACTIONS

(71) Applicant: Sony Interactive Entertainment Inc., Tokyo (JP)

(72) Inventors: Toru Yamamoto, San Mateo, CA (US); Katsuya Hyodo, San Mateo, CA (US); Koichi Aoki, San Francisco, CA (US); Robert E. Brown, Lafayette, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,866

(22) Filed: Jul. 29, 2021

(65) Prior Publication Data
US 2021/0357087 A1 Nov. 18, 2021

Related U.S. Application Data

(63) Continuation of application No. 16/826,071, filed on Mar. 20, 2020, now Pat. No. 11,093,114.
(Continued)

(51) Int. Cl.
*G06F 3/0482* (2013.01)
*A63F 13/25* (2014.01)
*G06F 3/0485* (2022.01)

(52) U.S. Cl.
CPC ............ *G06F 3/0482* (2013.01); *A63F 13/25* (2014.09); *G06F 3/0485* (2013.01)

(58) Field of Classification Search
CPC ...... G06F 3/0482; G06F 3/0485; A63F 13/25; A63F 13/533
See application file for complete search history.

(56) References Cited

U.S. PATENT DOCUMENTS

| | | |
|---|---|---|
| 7,194,701 B2 | 3/2007 | Stavely et al. |
| 8,640,166 B1 | 1/2014 | Craner |

(Continued)

OTHER PUBLICATIONS

International Application No. PCT/US2020/024044, "International Search Report and Written Opinion", dated Jul. 7, 2020, 12 pages.
(Continued)

*Primary Examiner* — Alvin H Tan
(74) *Attorney, Agent, or Firm* — Kilpatrick Townsend & Stockton LLP

(57) ABSTRACT

Techniques for better information sharing and control switching in a graphical user interface (GUI) are described. In an example, application windows are added to a dynamic area of a menu based on an execution of a menu application. The menu is presented in the GUI and each window is shown in a glanced state to provide quick information about the corresponding application. When the user focus shifts to a window, that window is presented in a focused state. Upon a user selection of the window, the window is presented in a selected state and includes one or more selectable controls. Based on the window in the selected state, an application module is updated to present an overlay window reproducing the window in the selected state. The overlay window is presented coextensive with and over the window in the selected state.

21 Claims, 16 Drawing Sheets

Related U.S. Application Data

(60) Provisional application No. 62/826,872, filed on Mar. 29, 2019.

(56) References Cited

U.S. PATENT DOCUMENTS

| | | | |
|---|---|---|---|
| 10,675,544 | B2 | 6/2020 | Stroud |
| 11,093,114 | B2 | 8/2021 | Yamamoto et al. |
| 2004/0221307 | A1 | 11/2004 | Arai et al. |
| 2005/0245314 | A1 | 11/2005 | Pirich et al. |
| 2006/0248471 | A1 | 11/2006 | Lindsay et al. |
| 2007/0130605 | A1 | 6/2007 | Chung |
| 2010/0014825 | A1 | 1/2010 | Curtis et al. |
| 2010/0058224 | A1 | 3/2010 | Chai et al. |
| 2010/0281374 | A1 | 11/2010 | Schulz et al. |
| 2011/0202872 | A1 | 8/2011 | Park |
| 2011/0244924 | A1 | 10/2011 | Jung et al. |
| 2014/0007013 | A1 | 1/2014 | Yun |
| 2014/0298253 | A1 | 10/2014 | Jin et al. |
| 2015/0128042 | A1 | 5/2015 | Churchill et al. |
| 2015/0234545 | A1 | 8/2015 | Churchill et al. |
| 2016/0062552 | A1 | 3/2016 | Jeong et al. |
| 2016/0191980 | A1 | 6/2016 | Yu et al. |
| 2016/0234564 | A1 | 8/2016 | Holyoak |
| 2019/0258365 | A1* | 8/2019 | Zurmoehle .......... G02B 27/017 |

OTHER PUBLICATIONS

International Application No. PCT/US2020/024049, "International Search Report and Written Opinion", dated Jul. 6, 2020, 11 pages.
International Application No. PCT/US2020/024050, "International Search Report and Written Opinion", dated Jul. 8, 2020, 15 pages.
PCT/US2020/024044, "International Preliminary Report on Patentability", dated Oct. 14, 2021, 9 pages.
PCT/US2020/024049, "International Preliminary Report on Patentability", dated Oct. 14, 2021, 8 pages.
PCT/US2020/024050, "International Preliminary Report on Patentability", dated Oct. 14, 2021, 11 pages.

* cited by examiner

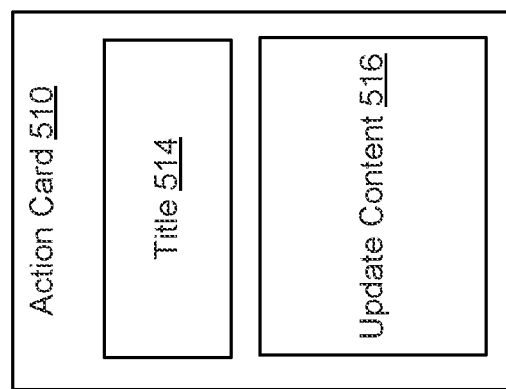
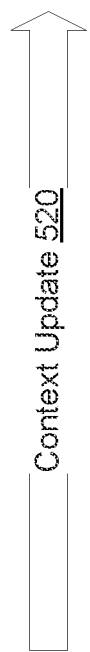
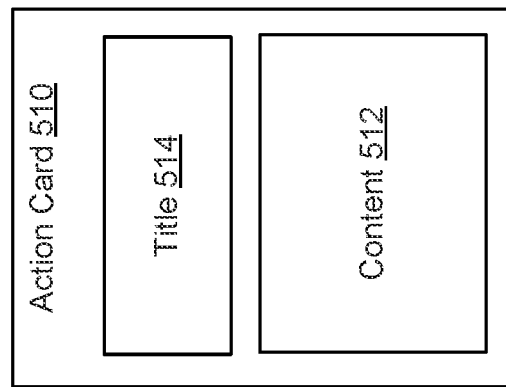
FIG. 5

USER INTERFACE MENU TRANSITIONS WITH SELECTABLE ACTIONS

CROSS-REFERENCES TO RELATED APPLICATIONS

This application is a continuation of U.S. patent application Ser. No. 16/826,071, filed Mar. 20, 2020, which claims the benefit of U.S. Provisional Patent Application No. 62/826,872, filed Mar. 29, 2019, which are hereby incorporated by reference in their entireties for all purposes.

BACKGROUND

Graphical user interfaces (GUIs) are the predominant type of interfaces available to users for interacting with computer systems. A GUI includes selectable icons to launch applications. Typically, upon a launch of a first application, the first application is presented in a first window. Upon a launch of a second application, a second window is used and the user control shifts from the first window to the second one. In addition, dynamic content (e.g., interactive media content) presented in the first window may be paused. If the user desires to interact with the first application, additional user input is needed to shift the control from the second window back to the first one.

To illustrate, consider an example of a GUI of a video game system hosting a video game application and a music streaming application. The GUI presents a home page that includes a video game icon and a music streaming icon. From this home page, a video game player selects the video game icon to launch the video game application. Video game content is then presented in the GUI. To stream music, the video game player may need to pause the execution of the video game application, switch back to the home page, and select the music streaming icon. Upon this selection, the music streaming application is launched and music can be played over speakers of the video game system. To resume the video game, the video game player may need to minimize the window of the music streaming application, switch back to the home page, expand the window of the video game application, and un-pause the video game content.

Hence, although a GUI can be an effective user interface, switching between applications may not be seamless and the presentation of information may be limited to an active window. There is a need for an improved GUI that allows better information sharing and control switching.

BRIEF SUMMARY

Embodiments of the present disclosure relate to techniques for better information sharing and control switching in a graphical user interface (GUI). In an example, a computer system presents, on a display communicatively coupled with the computer system, a menu based on an execution of a menu application. The menu comprises a plurality of windows. Each of the plurality of windows corresponds to a different application of the computer system and is presented in a glanced state according to a first window size. The presentation of a window in the glanced state comprises presenting content of a corresponding application. The computer system also instantiates, based on the presentation of the menu, an application module that has parameters common to the different applications. The computer system also receives a user interaction with the window. The computer system also presents, on the display, the window in a focused state based on the user interaction. The window and the content are resized in the focused state based on a second window size. The computer system also receives a user selection of the window while the window is in the focused state. The computer system also presents, on the display, the window in a selected state based on the user selection of the window. The window and the content are resized in the selected state based on a third window size. The computer system also updates, based on the window being in the selected state, the application module to include parameters specific to the corresponding application and to present an overlay window. The computer system also presents, on the display, the overlay window over the window in the selected state. The overlay window is presented according to the third window size and comprising the content. The computer system also dismisses, by terminating the execution of the menu application, the presentation of the window based on the presentation of the overlay window.

BRIEF DESCRIPTION OF THE DRAWINGS

FIG. 5 illustrates an example of content update based on a context, according to embodiments of the present disclosure.

DETAILED DESCRIPTION

Figure 1:
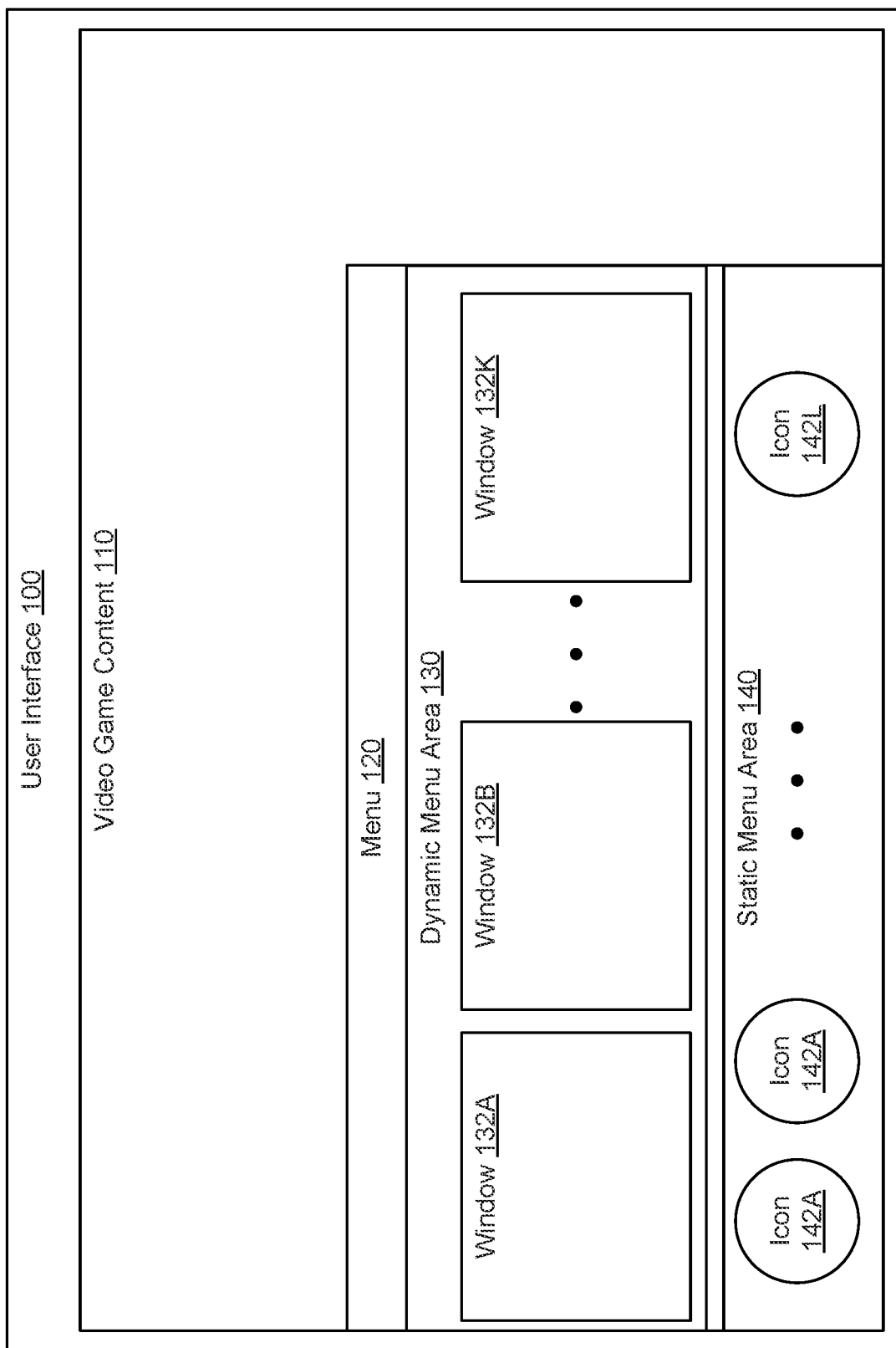
FIG. 1 illustrates an example of a context-based menu with selectable actions, according to an embodiment of the present disclosure.

Generally, systems and methods for better information sharing and control switching in a graphical user interface (GUI) are described. In an example, a computer system presents a GUI on a display. Upon an execution of a first application, first content of the first application is presented in the GUI. Upon user input requesting a menu, the menu is presented in a layer over at least a portion of the first content based on an execution of a menu application. The menu includes a dynamic area that presents a plurality of windows and a static area that presents icons. Each of the windows corresponds to a different application and can be included in the dynamic menu area based on a context of a user of the computer system and/or a context of the first application that is being executed. Each of the icons can be preset and can correspond to system function of the computer system or to a window of an application. The dynamic menu area shows the windows in a first state, where each window presents content in this state. Upon user interactions with the dynamic menu area, the presentation of the windows can change to a second state, where a window in the second state and its content are resized and where an action performable on the content can be selected. Upon a user selection of the window in the second state, the presentation of the window changes to a third state, where the windows and its content are resized again and where an action performable on the window can be further selected. Upon a user selection of the window action or the content action, the selected action is performed and user control is automatically switched back to the first application.

To illustrate, consider an example of a video game system. The video game system can host a menu application, a video game application, a music streaming application, a video streaming application, a social media application, a chat application, and multiple other applications. A video game player can login to the video game system and a home user interface is presented thereto on a display. From this interface, the video game player can launch the video game application and video game content can be presented on the display. Upon a user button push on a video game controller, a menu can be presented in a layer at the bottom of the display based on an execution of the menu application. The menu includes a game window that corresponds to the video game application and that presents content based on a context of a game play (e.g., presents an invitation to a car race tournament when the video game player is playing a car race game and is about to finish a current care race). The menu also includes a music window that corresponds to the music streaming application and that presents a music album from a music library of the video game player. The layer can present the menu in the foreground, while the execution of the video game application and the presentation of the video game content continue (e.g., the video game content can be continuously updated in the background showing the progress in the current car race). The windows within the dynamic area of the menu are shown in a glanced state, providing sufficient information to the video game player about the applications (e.g., to perceive the car race invitation and to see a cover of the music album). Upon a user key push on a video game controller, a scroll through the presented windows is performed, where only one of the windows is shown in a focused state at a time and remaining windows are shown in the glanced state. For instance, upon the user focus (e.g., the user scroll) being on the music window, that window is expanded to show a partial list of music files and to present a play key. If the play key is selected, the music stream starts, the music is played in the background, and the user control automatically switches back to the video game content such that the user can continue their game play (e.g., steer the car in the current car race). If the user selects the music window rather than the play key, the music window is further expanded to show the full list of the music files and to further present an option to pin the music window to the side of the video game content. Upon a selection of this option, the music window is shown adjacent to the video game content (e.g., in a small area on the left side of the display, while the video game content is shown on the remaining display area to the right). Here also, the user control automatically switches back to the video game content upon the pinning of the music window.

Embodiments of the present disclosure provide several advantages over existing computer systems and their underlying GUIs. For example, by selecting windows for presentation in a dynamic menu area, relevant application information can be surfaced to a user. By presenting these windows in different states (e.g., glanced, focused, and selected states) based on the user focus, the interactivity of the windows can be affined to the user focus (e.g., glance, focus, selection). In addition, the execution of any underlying application and the presentation of content of this application may not be interrupted and the user control can be automatically switched back to the application. Hence, the overall GUI allows seamless switching while improving the information sharing.

In the interest of clarity of explanation, the embodiments may be described in connection with a video game system. However, the embodiments are not limited as such and similarly apply to any other type of a computer system. Generally, a computer system presents a GUI on a display. The GUI may include a home user interface from which different applications of the computer system can be launched. Upon a launch of an application, a window that corresponds to the application can be presented in the GUI. Upon a user request for a menu, a context-based menu that includes a dynamic area and a static area can be displayed over the application's window. Applications of interest can be glanced at, focused, and/or selected from the menu, in addition to the selection of system controls. The menu can be dismissed and the user control can be automatically switched back to the application.

FIG. 1 illustrates an example of a context-based menu with selectable actions, according to an embodiment of the present disclosure. As illustrated, a graphical user interface 100 of a computer system (e.g., a video game system) is presented on a display. The GUI 100 presents video game content 110 of a video game application of the computer system (e.g., one executed by the video game system) and a menu 120 of a menu application of the computer system (e.g., one executed by the video game system). The menu 120 can be presented over at least a portion of the video game content 110 such that to appear in the foreground of the GUI 100 while the video game content 110 appears in the background of the GUI 100. For instance, the menu 120 and the video game content 110 are displayed within a menu window and a content window, respectively, where the menu window is shown in a layer that is over the content window and that overlaps with only a portion of the content window.

In an example, the menu 120 can occlude the portion of the video content 110 behind it or can have some degree of transparency. Additionally or alternatively, the texturing and/or brightness of the menu 120 and the video game content 110 can be set such that the menu 120 appears in the foreground and the video game content 110 appears in the background.

As illustrated, the menu 120 includes a dynamic menu area 130 and a static menu area 140. The dynamic menu area 130 presents a plurality of windows 132A, 132B, . . . , 132K, each of which corresponds to an application of the computer system. The static menu area 140 presents icons 142A, 142B, . . . , 142L, each of which corresponds to a system function (e.g., power on, volume control, etc.) or an application of the computer system. For brevity, each of the windows 132A, 132B, . . . , 132K is referred to herein as a window 132 and each of the icons 142A, 142B, . . . , 142L is referred to as an icon 142. By containing the two areas 130 and 140, the menu 120 represents a dashboard that shows contextually relevant features and relevant system functions without necessitating the user to exit their game play.

Generally, a window 132 is added to the dynamic menu area 130 based on a context of a user of the computer system (e.g., a video game player) and/or a context of an application being executed on the computer system. A context of the user (user context) generally includes any of information about the user, an account of the user, active background applications and/or services, and/or applications and/or services available to the user from the computer system or from other network environment (e.g., from a social media platform). A context of the application (application context) generally includes any of information about the application, specific content shown by the application, and/or a specific state of the application. For instance, the context of a video game player can include video game applications, music streaming applications, video streaming applications, social media feeds that the video game player has subscribed to and similar contexts of friends of the video game player. The context of a video game application includes the game title, the game level, a current game frame, an available level, an available game tournament, an available new version of the video game application, and/or a sequel of the video game application.

Based on a context, an interest of the user in an application can be determined. Accordingly, a window for that application can be added to the dynamic area 130 of the menu 120. As the context changes over time, the interest of the user can also change, whereby a different application can be identified and added to the dynamic area 130 in lieu of or in addition to a previously added application. In this way, the dynamic area 130 can be dynamically updated over time to reflect the most likely interests of the user.

In comparison, the static menu area 140 may not offer the dynamicity of the dynamic menu area 130. Instead, the icons 142 can be preset in the static menu area 140 based on system settings and/or user settings. Upon a selection of an icon 142, a corresponding window (e.g., for a system control or for a particular background application) can be presented. The menu 120 can be dismissed while the window is presented, or alternatively, the presentation of the menu 120 persists.

The content, interactivity, and states of the windows 132 are further described in connection with the next figures. Generally, upon the presentation of the menu 120, the execution of the video game application and the presentation of the video game content 110 continue. Meanwhile, user input from an input device (e.g., from a video game controller) can be received and used to interact with the menu 120 in the dynamic area 130 and/or the static area 140. The dynamic area interactions allow the user to view windows 132 in different states, and select and perform actions on the content of the windows 132 or the windows 132 themselves. The static area interactions allow the user to select any of the icons 142 to update the system functions (e.g., change the volume) or launch a preset window for a specific application (e.g., launch a window for a music streaming application). Once the interactions end, the menu 120 is dismissed and the user control automatically switches to the video game application (e.g., without input of the user explicitly and/or solely requesting the switch). Alternatively, the switch may not be automatic and may necessitate the relevant user input to change the user control back to the video game application. In both cases, user input received from the input device can be used to interact with the video game content 110 and/or the video game application.

In an illustration, a user request is received to present the menu 120 and the menu 120 is presented accordingly over the video game content 110. Based on the context of the user, an interest of the user in the music streaming application is determined. Further, based on the context of the video game application, an interest of the user in a game tournament is determined. Accordingly, the dynamic area 130 includes a music window (e.g., the first window 132A) corresponding to the music streaming application and a game window (e.g., the second window 132B) corresponding to the video game application. The music window may show, in a glanced state, a cover of a music album owned by the user. The game window may show, in the glanced state, an invitation to the game tournament. Upon a user scroll, the user focus on the windows 132 is updated. In particular, when the user scroll is over the music window, that window is presented in a focused state, while the remaining windows are presented in the glanced stated. In the focused state, the size of the music window and the cover are enlarged and an option is presented to play the music album. If a user selection to play the music album is received, the music streaming starts, the menu 120 is dismissed, and the user control switches back to the video game application. If a user selection of the music window is received instead, an option to pin the music window to the display can be presented. Upon performing the pinning, the music window is presented on the display, the menu 120 is dismissed, and the user control switches back to the video game application. If the user scroll continues, the music window is presented again in the glanced state. Similar interactivity with the video game application can occur. Here, if the user accepts the invitation to the game tournament, the video game application is updated to change the game play to the video game tournament and the video game content 110 would show that the video game player is joining the tournament.

Although FIG. 1 describes a window as being presented in a dynamic menu area or can be launched from an icon in a static menu area, other presentations of the window are possible. For instance, user input from the input device (e.g., a particular key push) can be associated with the window. Upon receiving the user input, the window can be presented in a layer over the video game content 110, without the need to present the menu 120.

Figure 2:
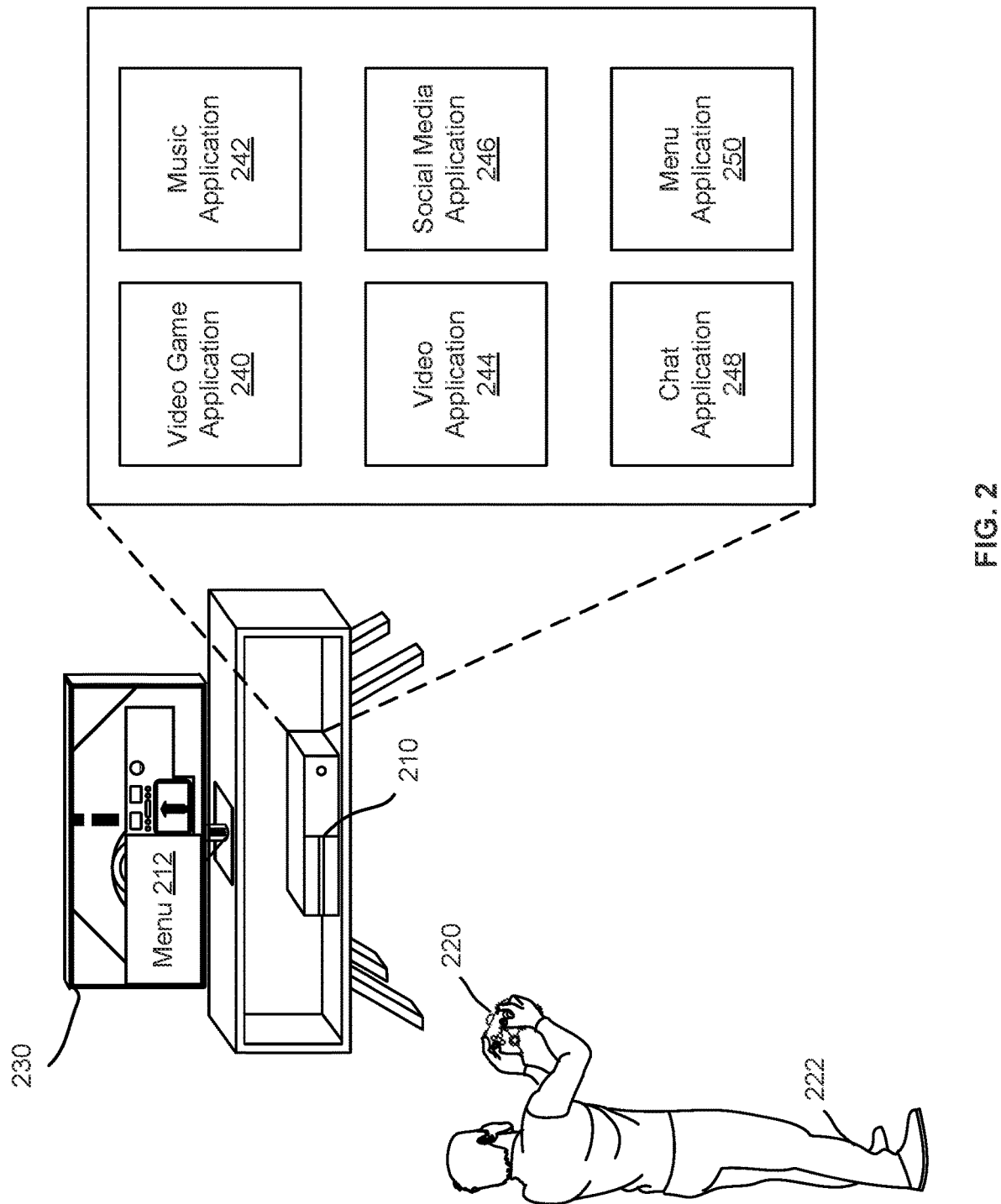
FIG. 2 illustrates a computer system that presents a context-based menu, according to an embodiment of the present disclosure.

FIG. 2 illustrates a computer system that presents a context-based menu, according to an embodiment of the present disclosure. As illustrated, the computer system includes a video game console 210, a video game controller 220, and a display 230. Although not shown, the computer system may also include a backend system, such as a set of cloud servers, that is communicatively coupled with the video game console 210. The video game console 210 is communicatively coupled with the video game controller 220 (e.g., over a wireless network) and with the display 230 (e.g., over a communications bus). A video game player 222 operates the video game controller 220 to interact with the video game console 210. These interactions may include playing a video game presented on the display 230, interacting with a menu 212 presented on the display 230, and interacting with other applications of the video game console 210.

The video game console 210 includes a processor and a memory (e.g., a non-transitory computer-readable storage medium) storing computer-readable instructions that can be executed by the processor and that, upon execution by the processor, cause the video game console 210 to perform operations relates to various applications. In particular, the computer-readable instructions can correspond to the various applications of the video game console 210 including a video game application 240, a music application 242, a video application 244, a social media application 246, a chat application 248, a menu application 250, among other applications of the video game console 210 (e.g., a home user interface (UI) application that presents a home page on the display 230).

The video game controller 220 is an example of an input device. Other types of the input device are possible including, a keyboard, a touchscreen, a touchpad, a mouse, an optical system, or other user devices suitable for receiving input of a user.

In an example, the menu 212 is a context-based menu similar to the menu 130 of FIG. 1. Upon an execution of the video game application 240, a rendering process of the video game console 210 presents video game content (e.g., illustrated as a car race video game content) on the display 230. Upon user input from the video game controller 220 (e.g., a user push of a particular key or button), the rendering process also presents the menu 212 based on an execution of the menu application 250. The menu 212 is presented in a layer over the video game content and includes a dynamic area and a static area. Windows in the dynamic area correspond to a subset of the applications of the video game console, where this subset represent applications of interest to the video game player 222 and is determined based on a context of the video game player 222 and/or a context of the video game application 240. For instance, given the context of the video game application 240, a game window corresponding to the video game application 240 is added to the menu 212. Given the context of the video game player 222, the music application 242 and the video application 244 may be of interest, but the social media application 246 and the chat application 248 may not be. Hence, a music window corresponding to the music application 242 and a video window corresponding to the video application 244 are added to the menu 212 (with other application windows corresponding to other applications of interest to the video game player 222).

Upon the presentation of the menu 212, the user control changes from the video game application 240 to the menu application 250. Upon a receiving user input from the video game controller 220 requesting interactions with the menu 212, the menu application 250 supports such interactions by updating the menu 212 and launching any relevant application in the background or foreground. The video game player 222 can exit the menu 212 or automatically dismiss the menu 212 upon the launching of an application in the background or foreground. Upon the exiting of the menu 212 or the dismissal based on a background application launch, the user control changes from the menu application 250 to the video game application 240. If a foreground application is launched, the user control changes from the menu application 250 to this application instead. In both cases, further user input that is received from the video game controller 220 is used for controlling the relevant application and/or for requesting the menu 212 again.

Although FIG. 2 illustrates that the different applications are executed on the video game console 210, the embodiments of the present disclosure are not limited as such. Instead, the applications can be executed on the backend system (e.g., the cloud servers) and/or their execution can be distributed between the video game console 210 and the backend system.

Figure 3:
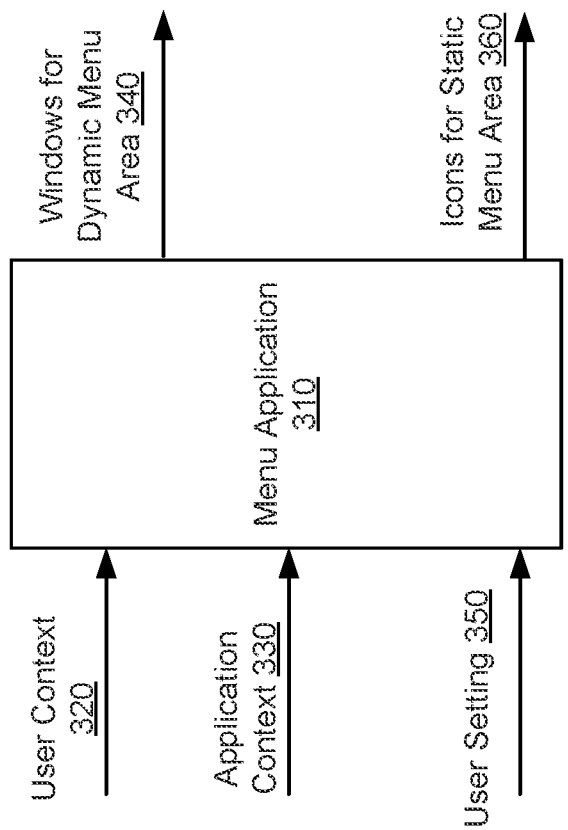
FIG. 3 illustrates an example of a context-based selection of windows, according to an embodiment of the present disclosure.

FIG. 3 illustrates an example of a context-based selection of windows, according to an embodiment of the present disclosure. As illustrated, based on a user context 320 and an application context 330, a menu application 310 includes windows 340 for a dynamic area of a menu. Based on a user setting 350, the menu application 310 includes icons 360 for a static area of the menu.

In an example, the user context 320 may be received over an application programming interface (API) of a context service, where this context service may collect contexts of users from different applications of a computer system or a network environment. The application context 330 may be received over an API from an application associated with the application context 330 (e.g., a video game context can be received from a corresponding video game application). The user setting 350 may be received from a user account or from a configuration file.

The menu application 310 may include a recommendation engine that recommends the windows 340 based on the user context 320 and the application context 330. The recommendation engine can maintain a list of applications (e.g., running in the background and/or foreground, and/or inactive but available to the user) and can rank the applications in potential levels of interest to the user given the user context 320 and the application context 330. The top ranked applications (e.g., the top twenty or some other number) can be recommended and windows 340 corresponding to these applications may be presented in the menu.

Although the menu application 310 is described as including the recommendation engine, these two components can be separate. For instance, whereas the menu application 310 is hosted on a video game console, the recommendation engine can be hosted as a separate application on the video game console or on backend server and an API may exist between the two components.

Figure 4:
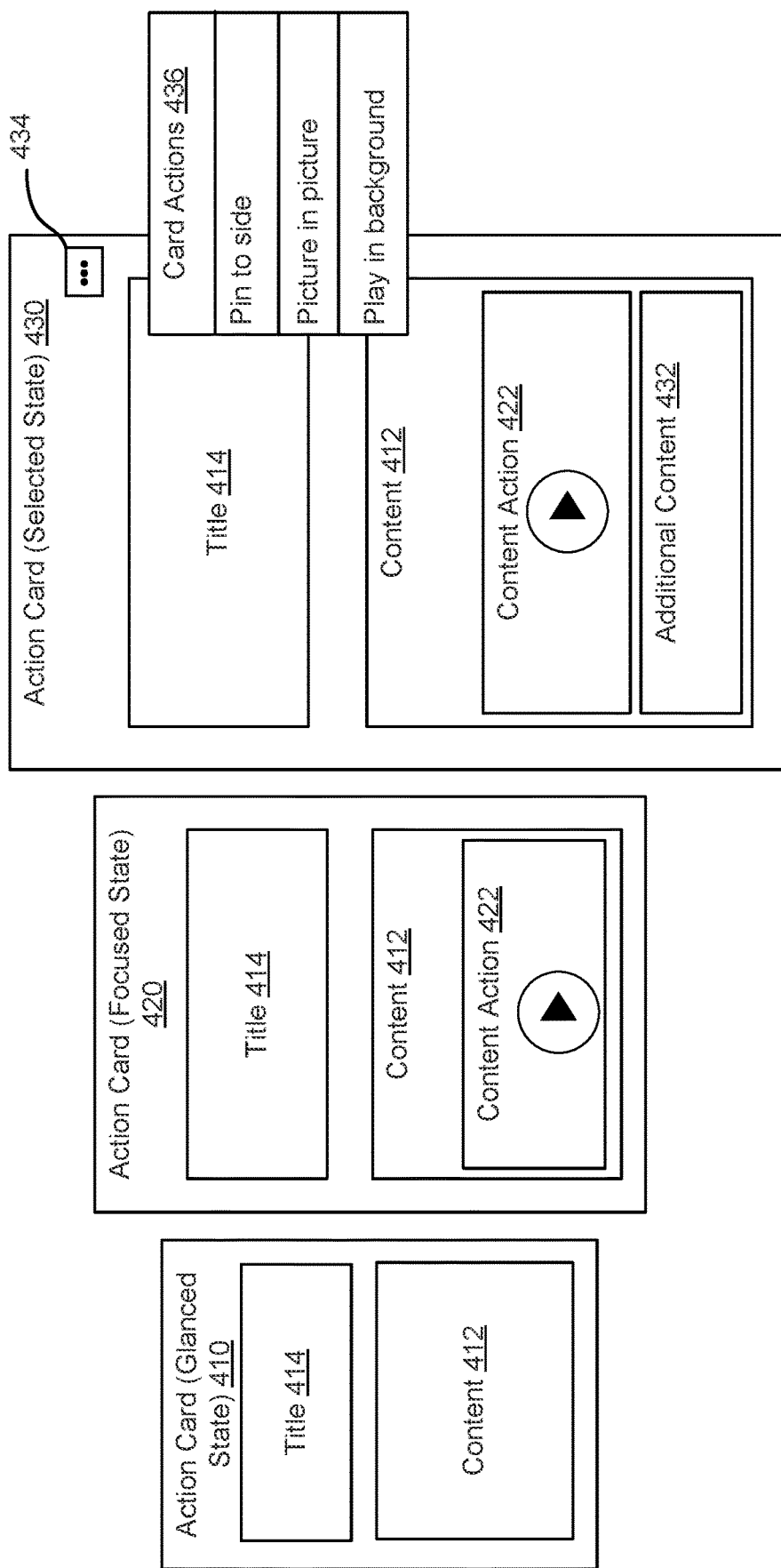
FIG. 4 illustrates an example of a window in different states, according to embodiments of the present disclosure.

FIG. 4 illustrates an example of a window in different states, according to embodiments of the present disclosure. Here and in subsequent figures, an action card is described as an example of a window and corresponds to an application. Generally, a window represents a GUI object that can show content and that can support an action performable on the content and/or window. In an example, the action card is a specific type of the window, where the action card a container object for MicroUX services, and where the action card contains content and actions for a singular concept. Action cards included in a context-based menu facilitate immediate and relevant actions based on contexts of what the users are engaged with and the relationships of people, content, and services within a computer environment.

As illustrated in FIG. 4, the action card can be presented in one of multiple states. Which state is presented depends on the user input, as further described in the next figures. One of the states can be a glanced state 410, where the action card provides a glance to the user about the application. The glance includes relevant information about the action card, where this information should help the user in deciding in taking an action or not. For example, in the glanced state 410, the action card has a first size, and presents content 412 and a title 414 of the content 412 or the action card based on the first size. To illustrate, an action card for a music application can be presented in the first state as a rectangle having particular dimensions, showing a cover and a title of a music album.

Another state can be a focused state 420, where the action provides relevant information to the user and one or more options for one or more actions to be performed (e.g., for one or selectable actions on content of the application or the action card itself). In other words, the action card can surface quick actions for the user to select in response to the user's focus being on the action card. For example, in the focused state 420, the action card has a second size (which can be larger than the first size), resizes the presentation of the content 412 and the title 414 based on the second size, and presents one or more selectable content actions 422 (e.g., play content, skip content, etc.) and one or more selectable card actions (e.g., move the action card to a position on the display, resize the action card, pint the action card, present the action card as a picture-in-picture, etc.). Referring back to the music action card illustration, in the focused state 420, the music cover and album title are enlarged and a play button to play music files of the music album is further presented.

Yet another state can be a selected state 430, where the action continues to provide relevant information to the user in a further enlarged presentation format, and provides one or more options for one or more actions to be performed on the connect and/or the action card itself (e.g., for one or selectable actions on content of the application or the action card itself). In other words, the action card becomes the primary modality for interacting with the MicroUX and displays the relevant visual interface. For example, in the selected state 430, the action card has a third size (which can be larger than the second size), resizes the presentation of the content 412 and the title 414 based on the third size, continues the presentation of the content action 422, presents additional content 432 of the application, and presents one or more options 434 for one or more content actions and for one or more card actions 436 that can be performed on the action card. Upon a user selection of the option 434, the card actions 436 are presented and can be selected. Referring back to the music action card illustration, in the selected state 430, the music cover and album title are further enlarged and the presentation of the play button continues. Additional music files of the music album are also identified. The option 434 provides the choice of pinning the action card to the side of other content that is being presented on the display (e.g., video game content), presenting the action card as a picture in picture within the other content, or to run the music application (e.g., play the music album) in the background.

In the above states, the content 412, title 414, content action 422, and additional content 432 can be identified from metadata received from the application. Upon performing a card action 436 (e.g., pinning the action card), the action card becomes the user interface to the application and content can be received from the application and presented at the user interface (e.g., if a music video clip is to be presented, this clip may be played in the pinned action card).

As illustrated in FIG. 4, the action card can include a static presentation and a dynamic presentation area, each of which can be resized depending on the state. For instance, the title 414 is presented in the static area, identifies the underlying application associated with the action card and does not change with the state. In comparison, the content 412 can be presented in the dynamic area and can change within each state and between the states. In particular, the content itself may be interactive (e.g., a video) and its presentation can by its interactive nature change over time. Additionally or alternatively, the content 412 can also be changed over time depending on the user context and/or the application context, as further described in connection with FIG. 5.

FIG. 5 illustrates an example of content update based on a context, according to embodiments of the present disclosure. As illustrated, an action card 510 presents content 512 and a title 514. Whereas the title 514 is static, the content 512 can be dynamically updated based on the context. For example, the action card 510 can be selected at a particular time for presentation in a menu based on a current user context and/or a current application context. The relevant content given the current context and/or current application context can also be selected and presented in the action card 510. At a subsequent time, the current context and/or current application context may have change (illustrated in the context update 520). Accordingly, if the action card 510 is still presented in the menu at this subsequent time, its content is updated (illustrated as updated content 516), whereas its title 514 remains the same.

To illustrate, consider an example of an action card for a video game application. The action card may present a score, a cred, and earned achievements of a video game player. At one point in time, the application context would indicate a particular score (e.g., fifty points) a particular cred (e.g., novice), and a particular achievement (e.g., completed training). Subsequently and as the user progresses through the video game, the application context would indicate an updated score (e.g., ninety points), an updated cred (e.g., a profession), and an updated achievement (e.g., completed levels one through five). Accordingly, the presentation of the action card at that time would show the updated score, the updated cred, and the updated achievement.

In another illustration, an action card corresponds to a social media application and presents social media posts of friends of the video game player. At one point in time, the user context indicates that two friends have posted comments on the corresponding social media platforms. Accordingly, the action card presents their comments. Subsequently, the updated user context indicates a new post from a third friend. Accordingly, the content of the action card is updated to include the new post.

The actual content of an action card can depend on the metadata provided from the underlying application. For a video game application, the content can include scores, progress, achievements, statistics of the video game players, statistics of other video game players, group statistics, available game options (e.g., cars in a car race game), activity of the video game player within the video game (e.g., "you have completed level one and are in level two, about to approach your target" informing the user about their progress over a period of time) and other relevant game information and options. For a social media application, the content can include posts, responses (including likes), trends, invitations, and other relevant social media information and options. For a music application, the content can include a music title, a music album, artist information, band information, purchase options, and other relevant music information. For a video application, the content can include a video title, a video frame, an animation of the video, a video trailer, information about actors, information about the director, purchase options, and other relevant video information.

Figure 6:
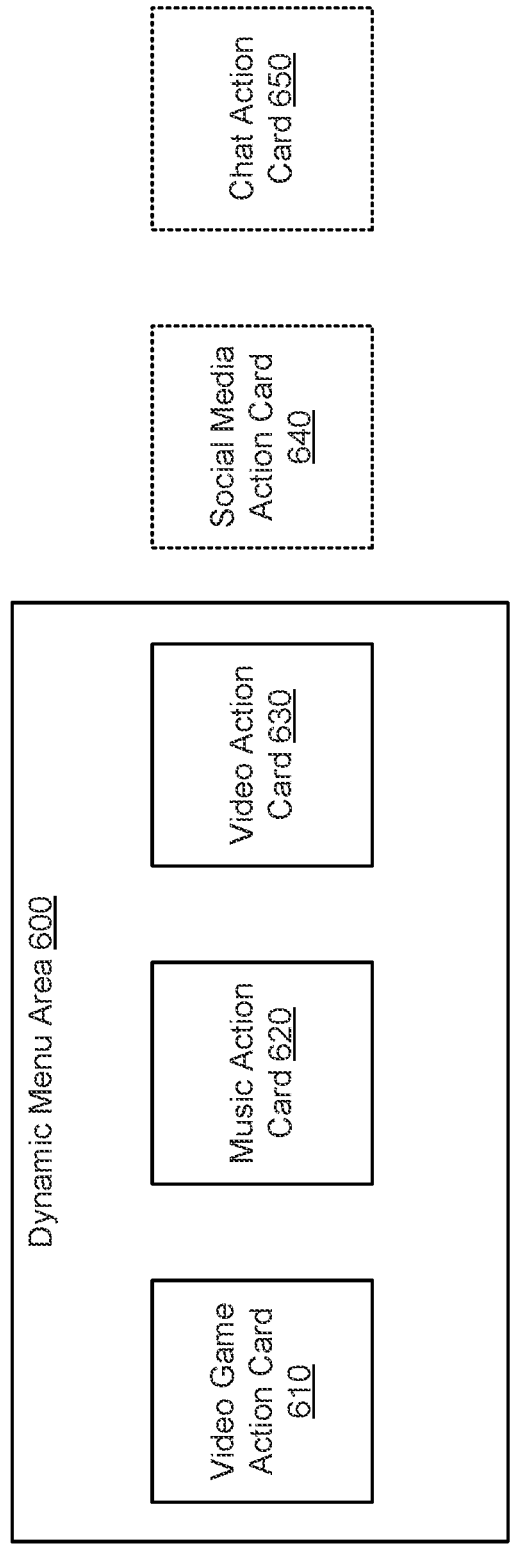
FIG. 6 illustrates an example of a dynamic menu area presenting windows in a first state, according to embodiments of the present disclosure.

FIG. 6 illustrates an example of a dynamic menu area 600 presenting windows in a first state, according to embodiments of the present disclosure. The dynamic menu area 600 is an example of the dynamic area 130 of the menu 120 of FIG. 1. As illustrated, the first state is a glanced state.

A computer system, such as a video game system, may host multiple applications including a video game application, a music application, a video application, a social media application, a chat application, and many other applications. Based on a user context and an application context, a determination is made that the video game application, music application, video application, social media application, and chat application are of most interest to the user among the different applications of the computer system. Accordingly, a menu application of the computer system can include action cards corresponding to the applications of interest in the dynamic menu area, illustrated as a video game action card 610, a music action card 620, a video action card 630, a social media action card 640, and a chat action card 650.

In an example, the action cards 610-650 are organized in a sequence, where their order in the sequence depends on the level of interest in the corresponding application. This sequence can be presented in a carousel-like format, with only a predetermined number of action cards being visible in the dynamic menu area 600 at a time, and with remaining action cards being scrollable into the dynamic menu area 600.

As illustrated, the video game action card 610 is likely of most interest to the user, followed by the music action card 620, which is followed by the video action card 630, which is followed by the social media card 640, which is followed by the chat action card 650. The dynamic area 600 is configured to present only three of these cards at a time. Hence, the video game action card 610, music action card 620, and video action card 630 are visible and the social media card 640 and chat action card 650 are not visible (shown with the dotted lines). Upon a user scroll to the right (or some other interaction, such as a mouse click or a touchscreen gesture), the video game action card 610 may no longer be visible, the music action card 620 and the video action card 630 may shift to the left, and the social media action card 640 may become visible as the action card on the right of the dynamic menu area 600.

Although FIG. 6 illustrates that a single action card can be presented for an underlying application, multiple actions cards can be similarly presented for the same application. Each of such action cards can include different content and/or selectable actions. For example, a video game player can be playing in a multi-player game as a member of a group challenging another group. One action card presents information related to the video game player (e.g., their scores, progress, achievements, and statistics). Another action card presents similar information but related to the video game player's group.

Figure 7:
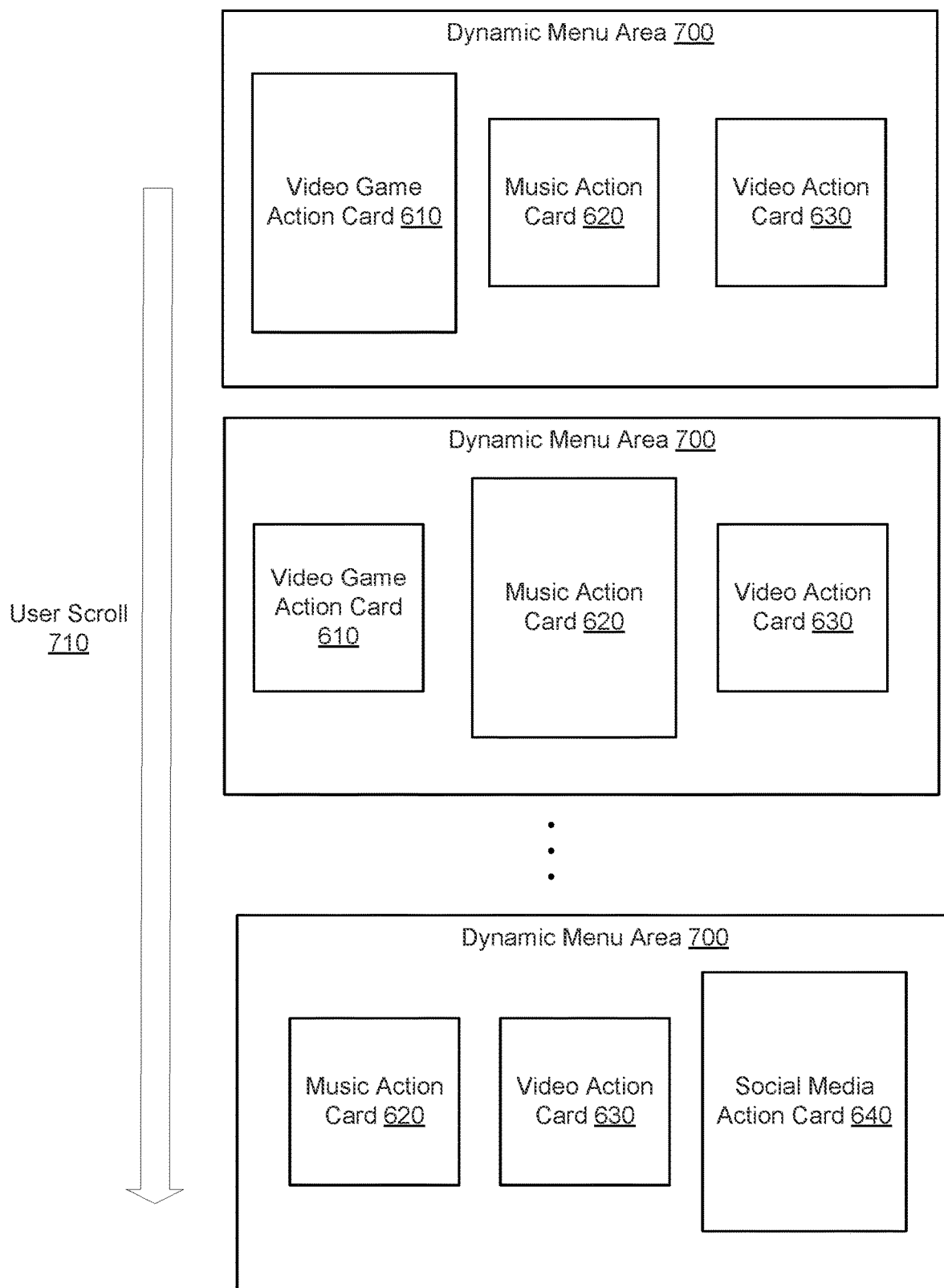
FIG. 7 illustrates an example of a dynamic menu area presenting windows in a first state and a second state based on user interactions, according to embodiments of the present disclosure.

FIG. 7 illustrates an example of a dynamic menu area 700 presenting windows in a first state and a second state based on user interactions, according to embodiments of the present disclosure. The dynamic menu area 700 is an example of the dynamic area 130 of the menu 120 of FIG. 1. As illustrated, the first state is a glanced state and the second state is a focused state. In the interest of clarity, the same action cards of FIG. 6 are used in the description of FIG. 7.

When the menu is invoked and the dynamic menu area 700 is presented on a display, this menu area 700 shows the video game action card 610, the music action card 620, and the video action card 630. Only one of these cards can be shown in the focused states, while the remaining action cards are shown in the glanced state because the user focus is assumed to be possible on only one action card at a time. At the start of the presentation of the dynamic menu area 700, the video game action card 610 is shown in the focused state because of the likely highest user interest in this card. Upon a user scroll 710 (or some other user interaction received from an input device) indicating a change to the user focus from the video game action card 610 to another action card, the presentation of the video game action card 610 changes to the glanced state and the presentation of the other in-focus action card is updated to the focused state. For instance, upon the user scroll 710 being with the music action card 620 (or any other user interaction with this card 620), the presentation of the music action card 620 shifts from the glanced state to the focused state. When the user scroll 710 (or any other user interaction) reaches the video action card 630, the presentation of this card 630 similarly shifts from the glanced state to the focused state and the presentation of the music action card 620 reverts to the glanced state. Of course, the user scroll can be in the opposite direction (e.g., from right to left) or can bring additional action cards into the dynamic menu area 700.

Figure 8:
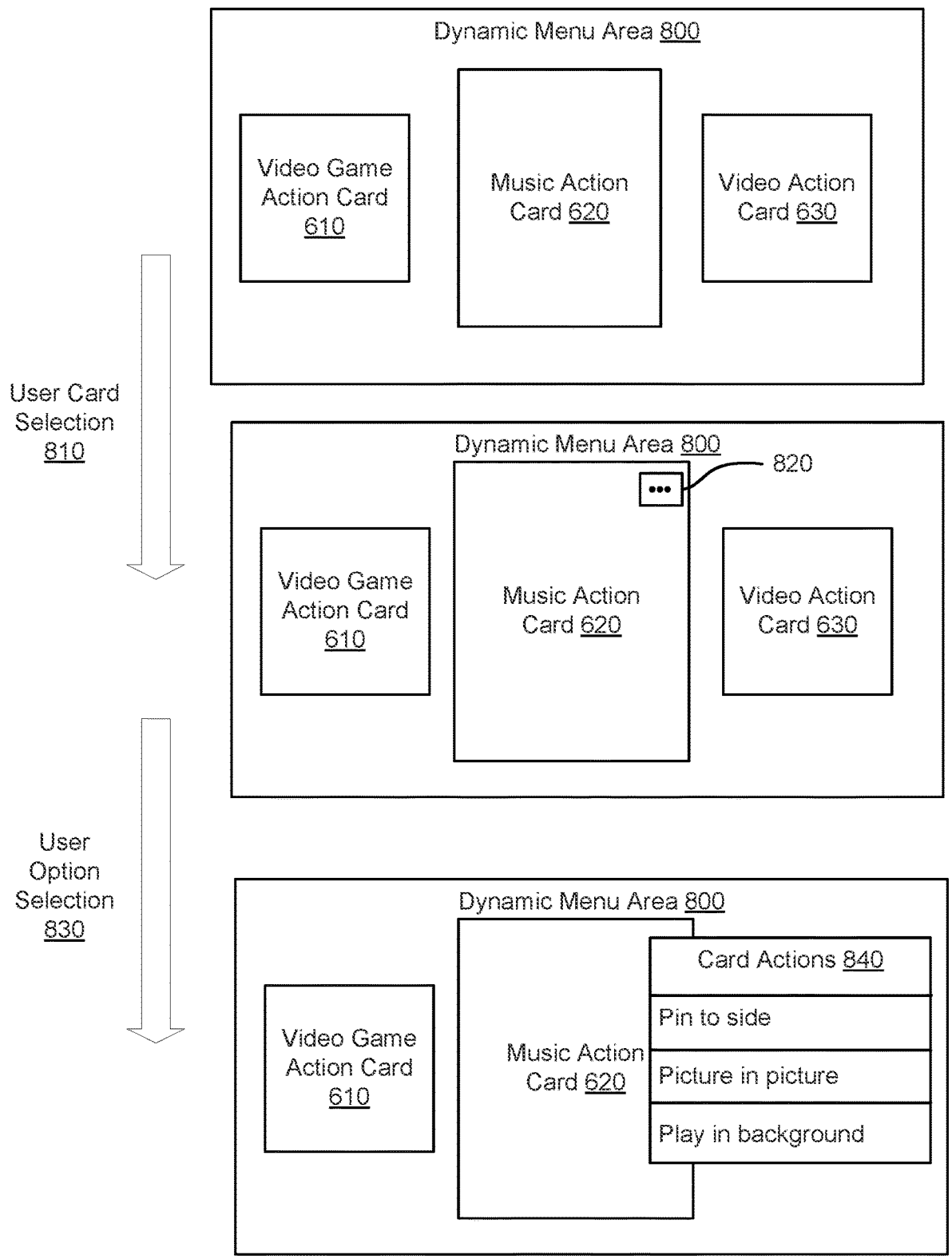
FIG. 8 illustrates an example of a dynamic menu area presenting windows in a second state and a third state based on user interactions, according to embodiments of the present disclosure.

FIG. 8 illustrates an example of a dynamic menu area 800 presenting windows in a second state and a third state based on user interactions, according to embodiments of the present disclosure. The dynamic menu area 800 is an example of the dynamic area 130 of the menu 120 of FIG. 1. As illustrated, the second state is a focused state and the third state is a selected state. In the interest of clarity, the same action cards of FIG. 6 are used in the description of FIG. 8.

In this illustration, the music action card 620 is in the focused state, while the video game action card 610 and the video action card 630 are in a glanced state. Upon a user selection 810 of the music action card (e.g., by pressing a specific button or key on the input device), the dynamic menu area 800 is updated to present the music action card 620 in the selected state. In the selected state, the presentation of the music action card 620 includes an option 820 selectable for performing an action on the music action card 620.

Upon a user selection 830 of the option 820 (e.g., by pressing a specific button or key on the input device), the dynamic menu area 800 is updated to present selectable actions 840 that can be performed on the music action card 620. These actions include, for instance, pinning the music action card to the side, presenting the music card 620 as a picture-in-picture, and launching the application in the background, among other possible actions (e.g., removing the music action card 620 from the dynamic menu area 800).

Figure 9:
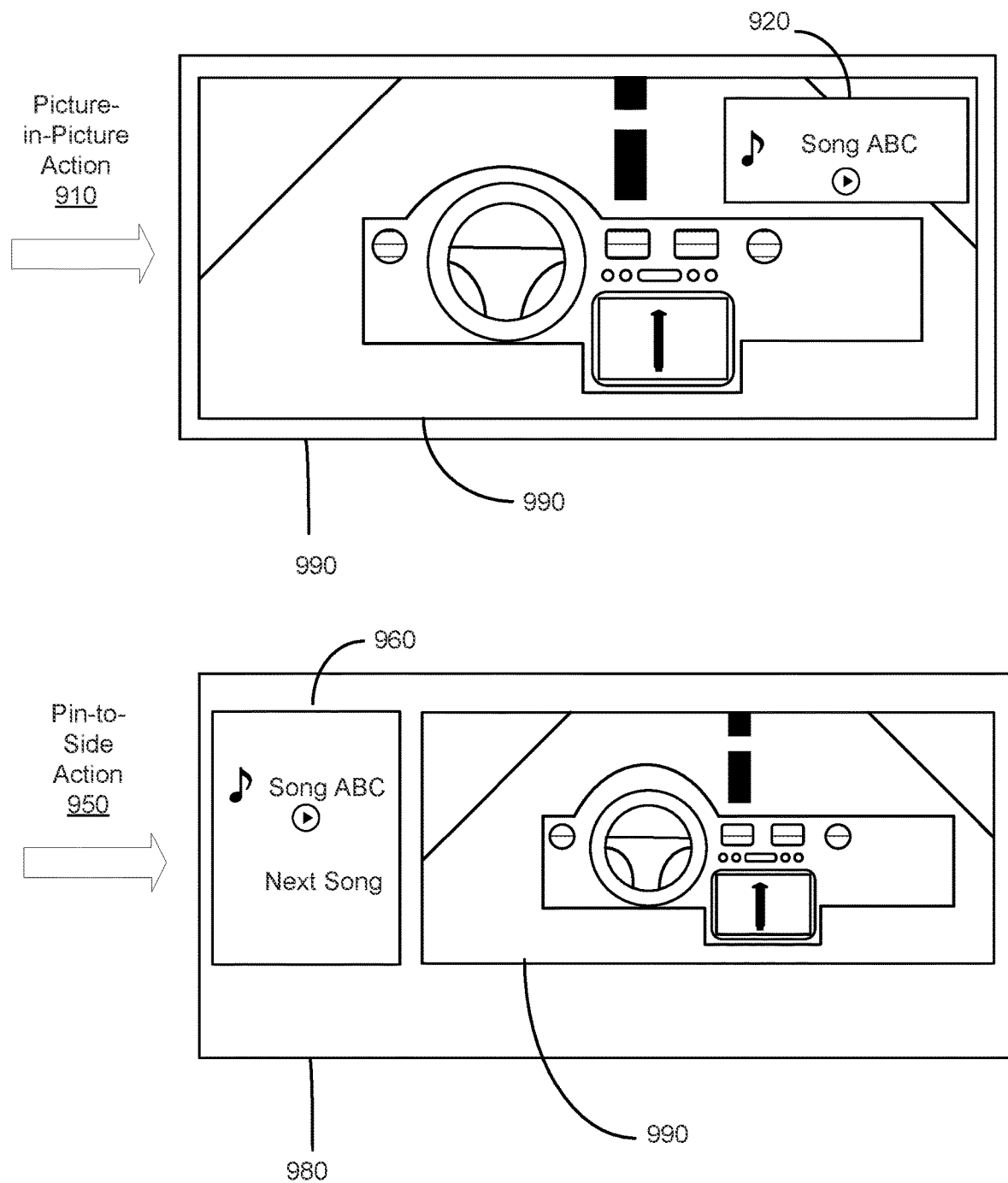
FIG. 9 illustrates an example of performing actions, according to embodiments of the present disclosure.

FIG. 9 illustrates an example of performing actions, according to embodiments of the present disclosure. Two actions are illustrated: a picture-in-picture action 910 and a pin-to-side action 950. Any of the two actions 910 and 950 can be performed upon a user selection under the card actions 840 of FIG. 8 and are illustrated in connection with the music application in the interest of clarity of explanation.

In this example, a GUI 980 presents video game content 990. Upon a user selection of the picture-in-picture action 910, a music action card 920 is pinned within the video game content 990 and appears as an overlay window that presents picture-in-picture content of the music application. For instance, the music action card 920 shows the title of a music file, a progress bar, and controls for pausing, resuming, skipping, and restarting the music file as a picture in picture. The music action card 920 can be the music action card 620 of FIG. 6 (e.g., driven by the application menu) resized according to any of the states (glanced, focused, or selected) or a different state (e.g., a picture-in-picture state). Alternatively, the music action card 920 can be an overlay window (e.g., an overlay action card) driven directly by the music application as further illustrated in connection with FIGS. 14 and 15.

In also this example, a upon a user selection of the pin-to-side action 950, a music action card 960 is presented as a pinned window (e.g., a pinned action card) to the side of the video game content 990. In this case, the video game content 990 may be resized to allow enough adjacent space for the pinning. Here also, the music action card 960 shows the title of the music file, the progress bar, and the controls. The music action card 960 can be the music action card 620 of FIG. 6 resized according to any of the states (glanced, focused, or selected) or a different state (e.g., a pin-to-side state). Alternatively, the music action card 960 can be an overlay window (e.g., an overlay action card) driven directly by the music application as further illustrated in connection with FIGS. 14 and 15.

Figure 10:
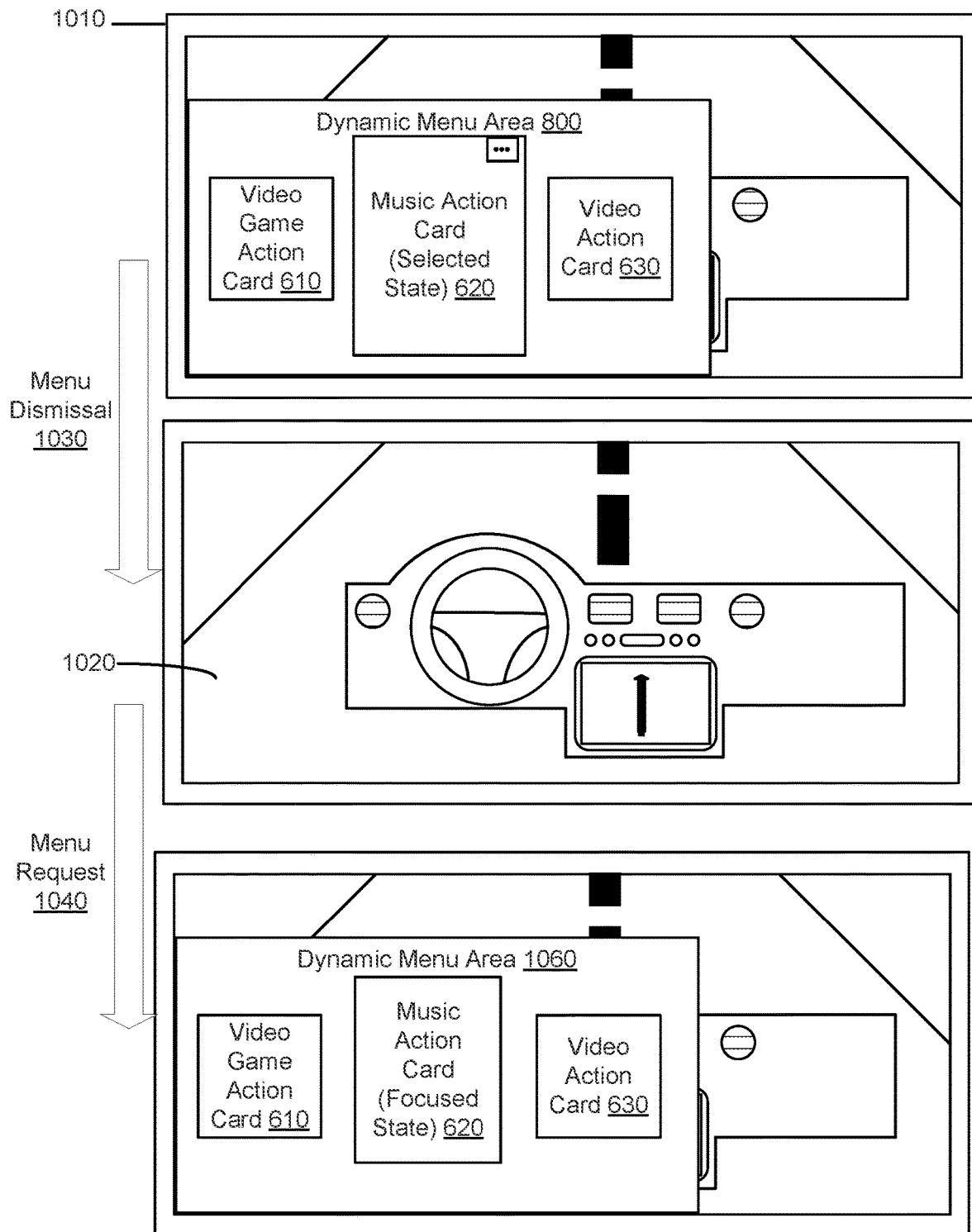
FIG. 10 illustrates an example of returning to a menu, according to embodiments of the present disclosure.

FIG. 10 illustrates an example of returning to a menu, according to embodiments of the present disclosure. Generally, if an action card was in a focused state or a selected state at the time the menu is dismissed, this action card can be shown in the focused state upon the subsequent presentation of the menu. In this way, the current user focus can be directed to the previous user focus. In the interest of clarity, the action cards of FIG. 6 and the dynamic menu area 800 of FIG. 8 are used in the description of FIG. 10.

As illustrated, a GUI 1010 presents video game content 1020. At a point in time, the dynamic menu area 800 is presented over the video game content 1020, with the music action card 620 being in the selected state. User input 1030 is received from the input device to dismiss the menu. The GUI 1010 is updated to present the video game content 1020 only. Additional user input 1040 is received, where this input 1040 requests the menu again. In response, the GUI 1010 is updated to present a dynamic menu area 1050. This dynamic menu area 1050 is the similar to the dynamic menu area 800 except that it shows the music action card 620 in a focused state.

In an example, the menu application tracks and stores the presentation states of the different action cards. In this way, upon a subsequent presentation of the menu and if the most current user and application contexts indicate that the same action cards should be presented again in the menu, the menu application can look up the presentation states and present one of the action cards in the focused state and the remaining ones in the glanced states.

In an example, when action cards are presented again in a menu, one or more factors can be used to determine the presentation state of each of these action cards. These factors include an update to a user context, an updated to an application context, an update to content, and an update to a ranking of the action cards relative to the interest of a user. To illustrate, consider the example of the three action cads illustrated in FIG. 10: the video game action card 610, the music action card 620, and the video action card 630. Upon the menu request 1040, these cards are presented again. If the application contexts of the music application and video application indicate that there are no changes, but the application context of the video game application indicates a change (e.g., a game tournament that became available.), the video game action card 610 may be shown in the focused state, while the other action cards are presented in the glanced state. If the user context indicates that a new video title was released and is of potential interest to the user, the video action card 630 may be presented in the focused state, while the other action cards are presented in the glanced state. Additionally or alternatively, rather than using one or more of these factors to set the states, the arrangement of the action within the dynamic menu area 1060 can be re-arranged. For instance, the action card that is of most likely interest to the user (e.g., as indicated by any or a combination of these factors), may be presented to the left within the dynamic menu area 1060 (optionally, in the focused state), the action card of next interest may be in the middle of the dynamic menu area 1060 (typically in the glanced state), and the action card of least interest may be to the right within the dynamic menu area 1060 (typically in the glanced state).

Figure 11:
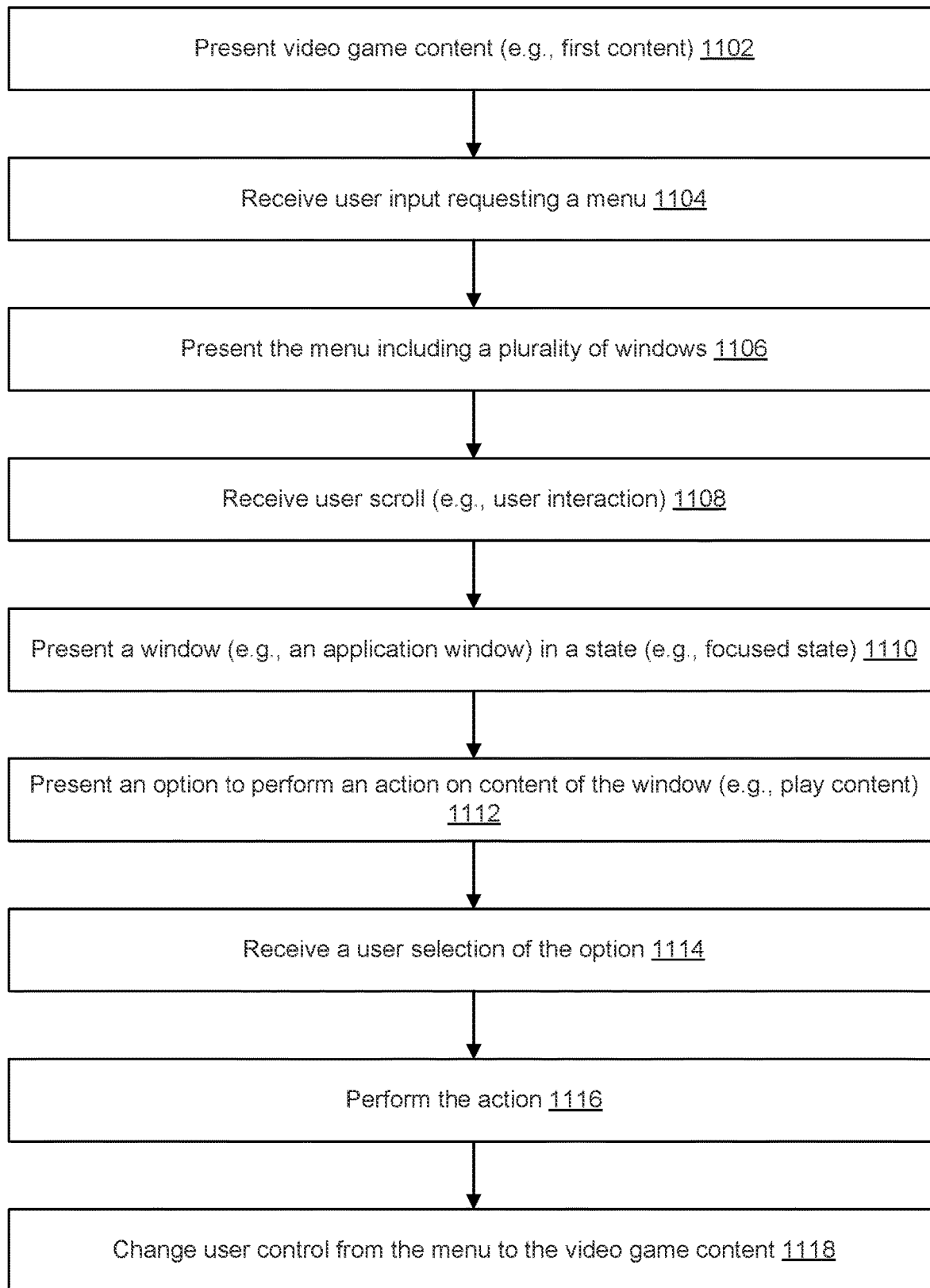
FIG. 11 illustrates an example flow for presenting a context-based menu with selectable actions, according to embodiments of the present disclosure.
Figure 12:
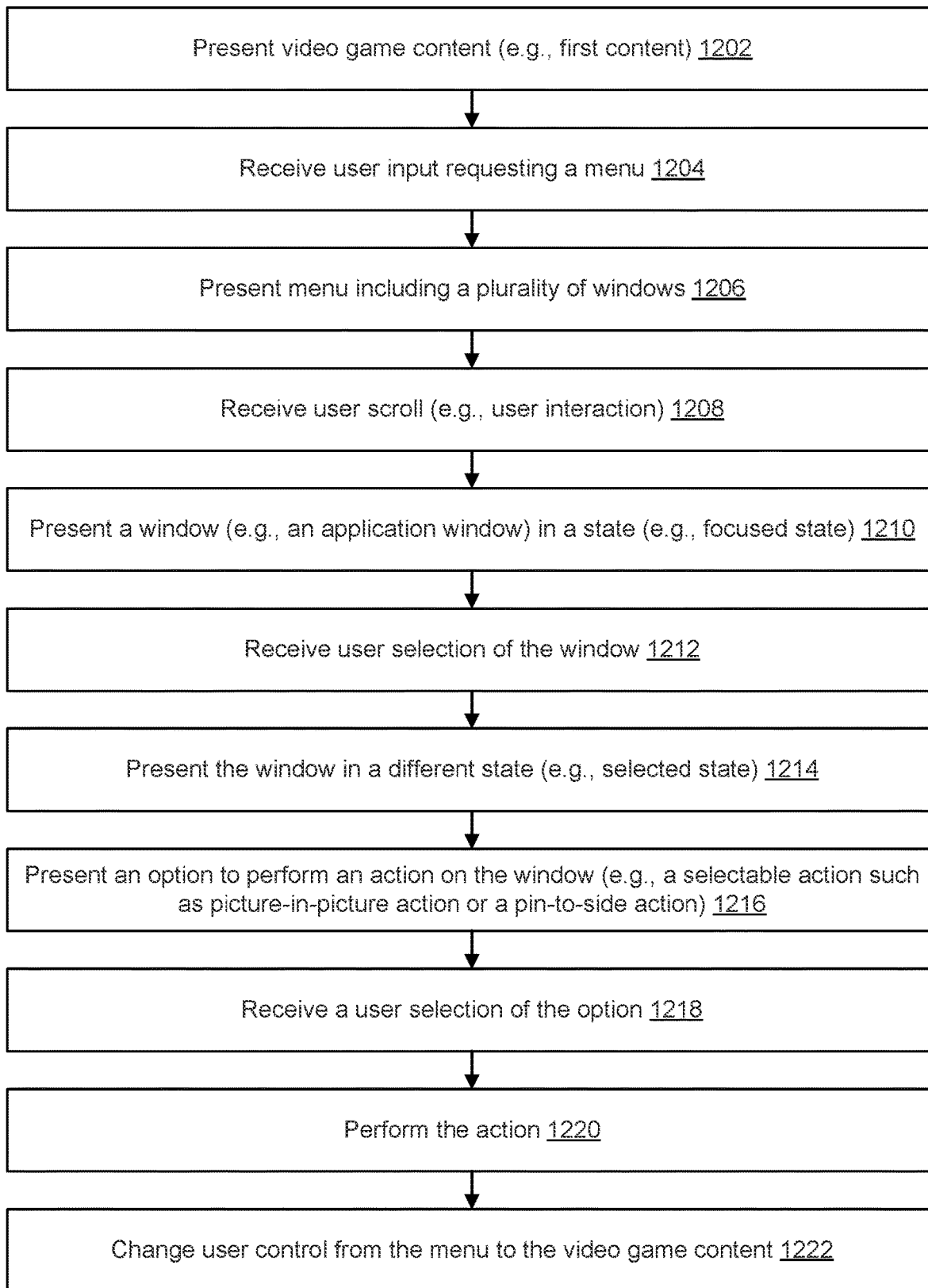
FIG. 12 illustrates an example flow for performing an action on window, according to embodiments of the present disclosure.
Figure 13:
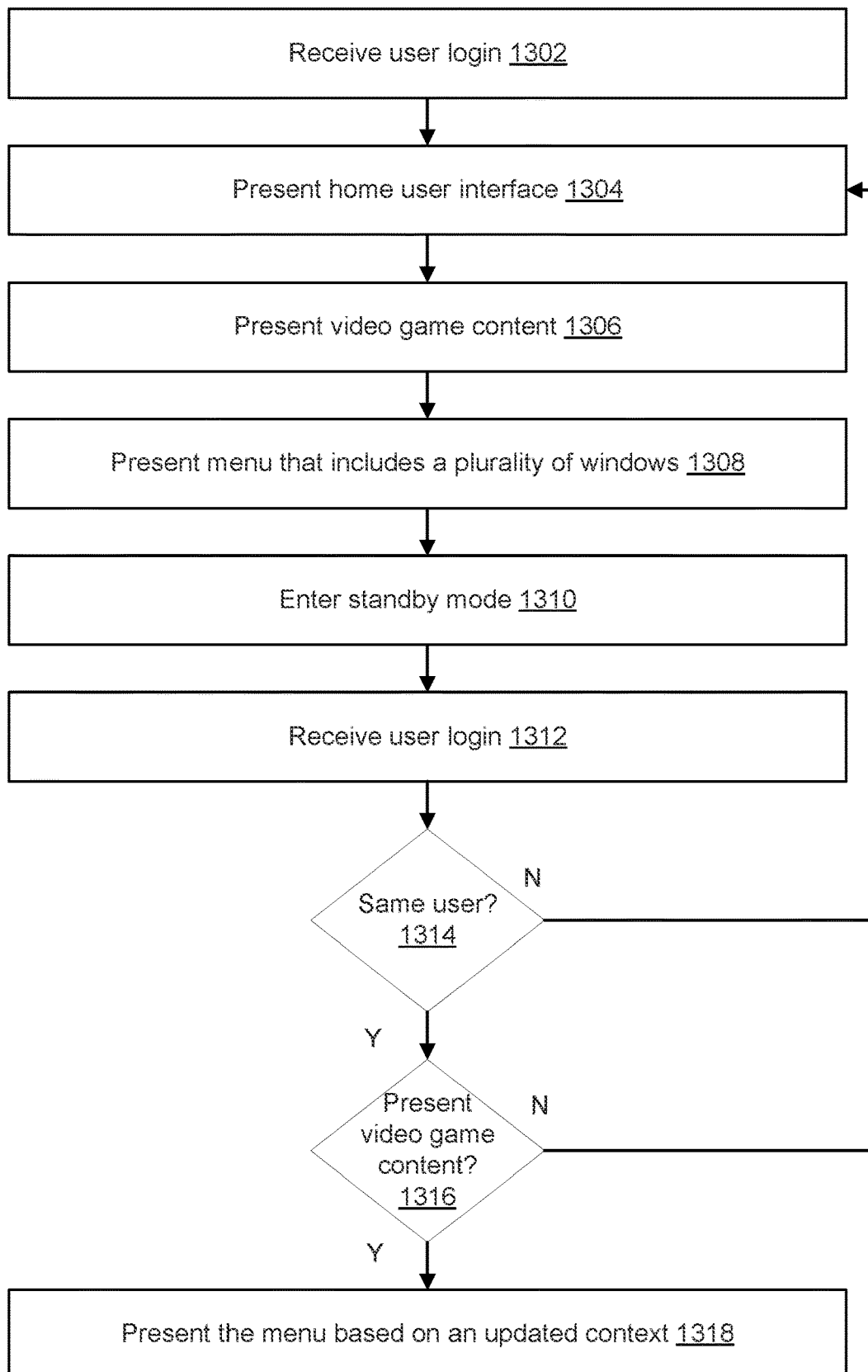
FIG. 13 illustrates an example flow for updating a context-based menu upon a user login, according to embodiments of the present disclosure.

FIGS. 11-13 illustrate example flows for using a context-based menu. The operations of the flows can be implemented as hardware circuitry and/or stored as computer-readable instructions on a non-transitory computer-readable medium of a computer system, such as a video game system. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

FIG. 11 illustrates an example flow for presenting a context-based menu with selectable actions, according to embodiments of the present disclosure. Generally, this flow may be implemented for overlaying multiple action cards (or other types of windows) on video game content (or a window of an application) and scrolling through the action cards to change focus and perform actions.

In an example, the flow includes an operation 1102, where the computer system presents video content of a video game application (e.g., first content of a first application) on a display. The video game application can be executed on the computer system and the video game content can be presented based on the game play of a user of the computer system (e.g., a video game player).

In an example, the flow includes an operation 1104, where the computer system receives user input requesting a menu. For instance, the user input is received from an input device (e.g., a video game controller) and corresponds to a user push of a key or button on the input device (e.g., a particular video game controller button) or any other type of input (e.g., a mouse click). An event may be generated from the user input indicating a command. The command can be for the presentation of the menu. Otherwise, the command can be for other controls (e.g., the display of a home user interface, an exit from the video game application, etc.) depending on the type of the user input.

In an example, the flow includes an operation 1106, where the computer system presents the menu, where this menu is a context-based menu that includes a plurality of windows (e.g., action cards) displayed in a dynamic area of the menu and a plurality of icons displayed in a static area of the menu. For instance, the menu is presented in response to the command for the menu presentation. In addition, a user context and an application context can be determined and used to select particular application or remote computing services that are likely of interest to the user. Each window within the dynamic menu area corresponds to one of these applications. The windows can also be presented in a first state (e.g., a glanced state).

In an example, the flow includes an operation 1108, where the computer system receives a user scroll through the windows within the dynamic menu area (or any other types of interactions within the dynamic menu area indicating a focus of the user). The user scroll can be received based on user input from the input device and a relevant event can be generated based on this input.

In an example, the flow includes an operation 1110, where the computer system presents a window (e.g., an application window corresponding to one of the applications where the user focus is currently on) in another state (e.g. a second state such as a focused state). For instance, if the user scroll is over the window, that window is presented in the focused state, while the presentation of the remaining windows is in the glanced state.

In an example, the flow includes an operation 1112, where the computer system presents an option to perform an action (e.g., a selectable action) on content of the window (e.g., to play the content). For instance, the option is presented when the window is in the focused state.

In an example, the flow includes an operation 1114, where the computer system receives a user selection of the option. The user selection can be received based on user input from the input device and a relevant event can be generated based on this input.

In an example, the flow includes an operation 1116, where the computer system performs the action. For instance, the content of the application can be played in the background. In another illustration, if the window corresponds to the video game application (e.g., is a game window), the video game content can be updated.

In an example, the flow includes an operation 1118, where the computer system changes user control from the menu to the video game content. For instance, the presentation of the menu is dismissed, while the presentation of the content continues in the background and/or the video game content is updated. User input received subsequently can be used to control the video game application or to request the menu again.

FIG. 12 illustrates an example flow for performing an action on window, according to embodiments of the present disclosure. Generally, this flow may be implemented for overlaying multiple action cards (or other types of windows) on video game content (or a window of an application) and scrolling through the action cards to select and perform an action on an action card, such as by pinning the action card within or next to the video game content. The example flow of FIG. 12 includes operations that are similar to the example flow of FIG. 11 and these two flows can be performed in conjunction or independent of each other.

In an example, the flow includes an operation 1202, where the computer system presents video content of a video game application (e.g., first content of a first application) on a display. The video game application can be executed on the computer system and the video game content can be presented based on the game play of a user of the computer system (e.g., a video game player).

In an example, the flow includes an operation 1204, where the computer system receives user input requesting a menu. For instance, the user input is received from an input device (e.g., a video game controller) and corresponds to a user push of a key or button on the input device (e.g., a particular video game controller button) or any other type of input (e.g., a mouse click). An event may be generated from the user input indicating a command. The command can be for the presentation of the menu. Otherwise, the command can be for other controls (e.g., the display of a home user interface, an exit from the video game application, etc.) depending on the type of the user input.

In an example, the flow includes an operation 1206, where the computer system presents the menu, where this menu is a context-based menu that includes a plurality of windows (e.g., action cards) displayed in a dynamic area of the menu and a plurality of icons displayed in a static area of the menu. For instance, the menu is presented in response to the command for the menu presentation. In addition, a user context and an application context can be determined and used to select particular application or remote computing services that are likely of interest to the user. Each window within the dynamic menu area corresponds to one of these applications. The windows can also be presented in a glanced state. In one illustration, the window of most likely interest to the user given the user context and application context can be shown in another state (e.g., the focused state). In another illustration, if one of the windows was selected or was in a focused state upon the most previous dismissal of the menu, that window can be presented in the focused state.

In an example, the flow includes an operation 1208, where the computer system receives a user scroll through the windows within the dynamic menu area (or any other types of interactions within the dynamic menu area indicating a focus of the user). The user scroll can be received based on user input from the input device and a relevant event can be generated based on this input.

In an example, the flow includes an operation 1210, where the computer system presents a window (e.g., an application window corresponding to one of the applications where the user focus is currently on) in the other state (e.g. the focused state). For instance, if the user scroll is over the window, that window is presented in the focused state, while the presentation of the remaining windows is in the glanced state.

In an example, the flow includes an operation 1212, where the computer system receives a user selection of the window. The user selection can be received based on user input from the input device and while the window is presented in the focused state. A relevant event can be generated based on this input.

In an example, the flow includes an operation 1214, where the computer system presents the window in a different state (e.g. a selected state). For instance, the window's size is changed from the focused state to the selected state, while the presentation of the remaining windows remains in the glanced state.

In an example, the flow includes an operation 1216, where the computer system presents an option to perform an action (e.g., a selectable action) on the window (e.g., to pin to side or to show as a picture in picture). For instance, the option is presented as an icon within the window when the window is in the selected state.

In an example, the flow includes an operation 1218, where the computer system receives a user selection of the option. The user selection can be received based on user input from the input device and a relevant event can be generated based on this input.

In an example, the flow includes an operation 1220, where the computer system performs the action. For instance, a pin-to-side operation or a picture-in-picture operation are performed on the window or on a corresponding overlay window. If an overlay window is used, the window may be dismissed.

In an example, the flow includes an operation 1222, where the computer system changes user control from the menu to the video game content. For instance, the presentation of the menu is dismissed, while the presentation of the content continues in the pinned window or the picture-in-picture window. User input received subsequently can be used to control the video game application or to request the menu again. In an illustration, a subset of the buttons, keys, or gestures on the input device are mapped to and usable for controlling the video game application, while another subset of the buttons, keys, or gestures are mapped to and usable for controlling the pinned window or picture-in-picture window. In this way, the user can have simultaneous control over both the video game application and the other application (that interfaces with the user through the pinned window or picture-in-picture window) depending on the buttons on the input device.

FIG. 13 illustrates an example flow for updating a context-based menu upon a user login, according to embodiments of the present disclosure. Generally, this flow may be implemented for presenting an updated context-based menu again upon a new user login to the computer system, following a logout while the context-based menu was on the display. The example flow of FIG. 13 can be performed in conjunction or independent of the examples flows of FIGS. 11 and 12.

In an example, the flow includes an operation 1302, where the computer system receives a user login. For instance, user credentials are received from the input device and are used to login the user to the computer system.

In an example, the flow includes an operation 1304, where the computer system presents a home user interface. The home interface may present different options for selecting and launching applications of the computer system.

In an example, the flow includes an operation 1306, where the computer system presents video game content of a video game application (e.g., a first content of a first application). For instance, user input may be received from the input device. The user input may select the video game application. Accordingly, the computer system launches the video game application and presents the video game content.

In an example, the flow includes an operation 1308, where the computer system presents a menu that includes a plurality of windows in a dynamic area of the window. For instance, user input may be received from the input device requesting the menu. In response, the computer system presents the menu over the video game content based on an execution of a menu application.

In an example, the flow includes an operation 1310, where the computer system enters a standby mode. For instance, user input may be received from the input device requesting a logout or a power standby mode. In response, the computer system may store the game play and the configuration of the menu including the states of the different windows, and may enter the standby mode. The stored information may be saved under a user profile of the user.

In an example, the flow includes an operation 1312, where the computer system receives another user login. For instance, user credentials are received from the input device and are used for another login to the computer system.

In an example, the flow includes an operation 1314, where the computer system determines whether the user logging in is the same user that logged out. For instance, the user name from the received credentials can be compared to the user profile from the previous login session. If a match exists, the computer system determines that it is the same user and operation 1316 follows operation 1314. Otherwise, the computer system determines that it is not the same user and the computer system loops back to operation 1304 to present a home user interface.

In an example, the flow includes an operation 1316, where the computer system determines whether to present the video game content. For instance, if the last logout occurred while the video game application was executed in the foreground, the computer system determines to present the video game content and operation 1318 follows operation 1316. Otherwise, the computer system determines that the video game content need not be presented and loops back to operation 1304 to present the home user interface.

In an example, the flow includes an operation 1318, where the computer system presents the menu based on an updated context. Here, the video game content is presented on the display again. At the last logout, the menu was also presented. Accordingly, the computer system also presents the menu over the video game content. However, because the menu is context-based and the user context and/or application context may have changed between the logout and the new login, an update to the menu may be performed. In particular, given the most up-to-date user context and application context, the content of the windows of the menu can be changed, the order of the windows in the sequence can be changed, and/or some of the windows may be removed and new windows may be added to the menu.

Figure 14:
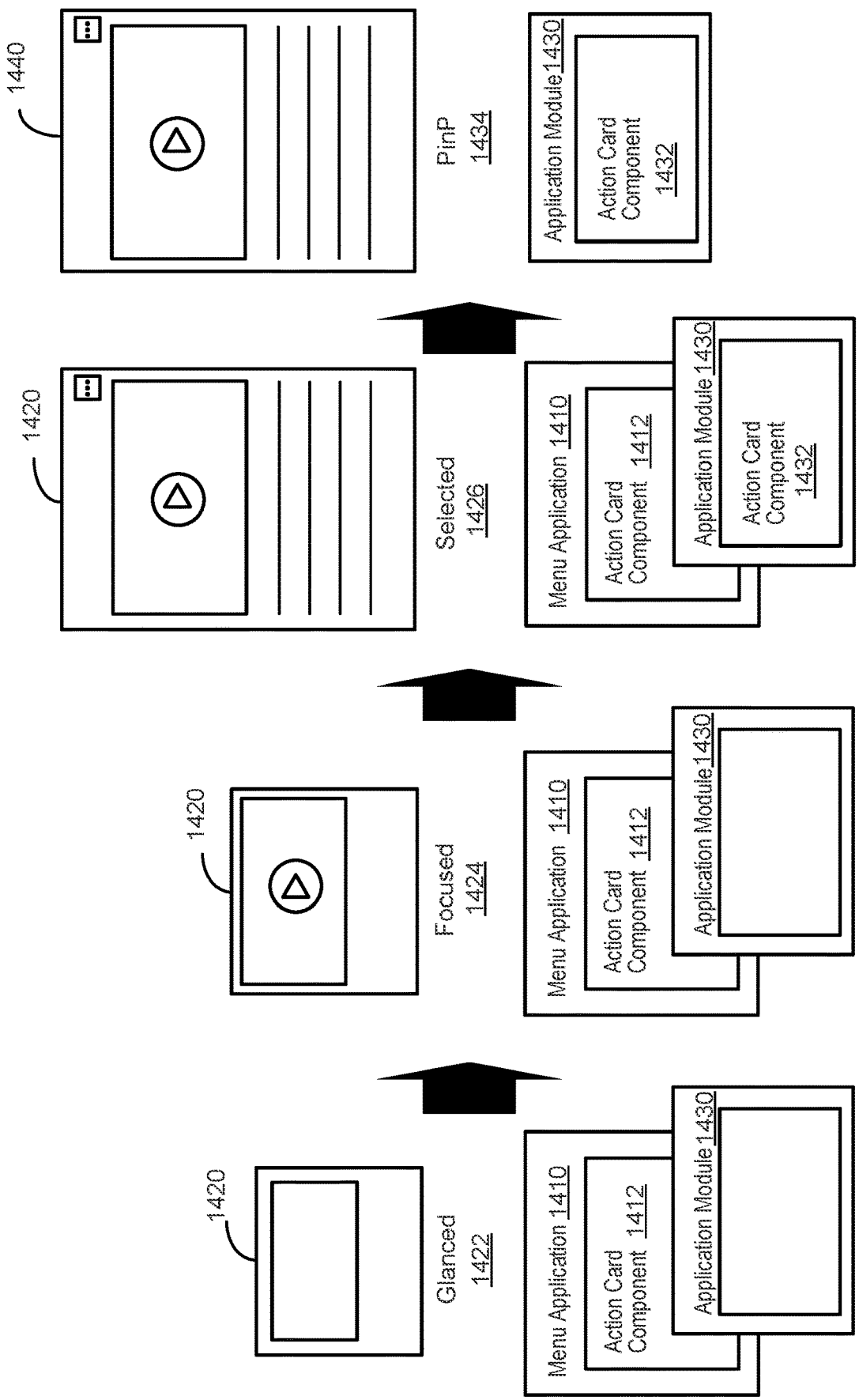
FIG. 14 illustrates an example of launching an application module and terminating a menu application, according to embodiments of the present disclosure.

FIG. 14 illustrates an example of launching an application module and terminating a menu application, according to embodiments of the present disclosure. In particular, the menu application is used to present a menu that includes a plurality of windows. Upon a selection of one of the windows that corresponds to an application, an action can be performed on the window (e.g., a pin-to-side action or a picture-in-picture action). From that point on, the underlying application, rather than the menu application, would drive the pinned window or picture-in-picture window and the menu application can be terminated or run in the background.

As illustrated, a menu application 1410 supports the presentation of a window 1420 in a glanced state 1422, a focused state 1424, and a selected state 1426 depending on user input from an input device as explained herein above. The window 1420 corresponds to an application (referred to herein as an "underlying application" in the interest of clarity). Metadata of the underlying application may be received by the menu application to populate, by the menu application 1410, the content and selectable actions on the content in the window 1420 as relevant to each state (the content and selectable actions are shown as "action card component 1412").

In an example, when the window 1420 is added (along with other windows corresponding to different underlying applications) to the menu, the menu application 1410 also instantiates an application module 1430. The application module 1430 can be a logical container for coordinated objects related to a task (e.g., to present an interfacing window) with optional programming window. The application module 1430 can have parameters common to the different underlying applications (e.g., common objects), whereby it represents a shell from which any of these applications can be quickly launched. When the window 1410 is in the glanced state 1422 or the focused state 1424, the menu application 1410 does not pass content or application-related information to the application module 1430 (this is illustrated in FIG. 14 with blank area of the application module 1430).

When the window 1420 starts transitioning from the focused state 1424 to the selected state 1426 in response to a user selection of the window 1420, the size, content, and selectable actions of the window 1420 start changing. The menu application passes information about this change along with parameters specific of the underlying application (that corresponds to the window 1420) to the application module 1430 (e.g., state information, programming logic, etc.). Accordingly, the application module 1430 would have the same action card component 1432 as the action card component 1412 presented in the window 1420 during the transition to and in the selected state 1426. In addition, the application module 1430 corresponds to an instantiation of the underlying application given the specific parameters of this application.

During the transition and in the selected state 1426, the application module 1430 supports an overlay window 1440 that has the same size and includes the same content and actions as the window 1420. A rendering process presents the overlay window 1440 over the window 1420, such that both windows completely overlap during the transition and in the selected state 1426. Hence, from a user perspective, the user would only perceive one window (e.g., the overlay window 1440), while in fact two windows are presented on top of each other.

Upon the end of the transition or upon user input requesting action, the window 1420 may be dismissed (e.g., closed) and the overlay window 1440 may be used instead. For instance, a picture-in-picture action 1434 (and similarly, a pin-to-side action or other actions) can be selected from the overlay window 1440 and performed on the overlay window 1440. From that point, the overlay window 1440 becomes the interface to the underlying application and the menu application 1410 can be terminated (or run in the background).

Figure 15:
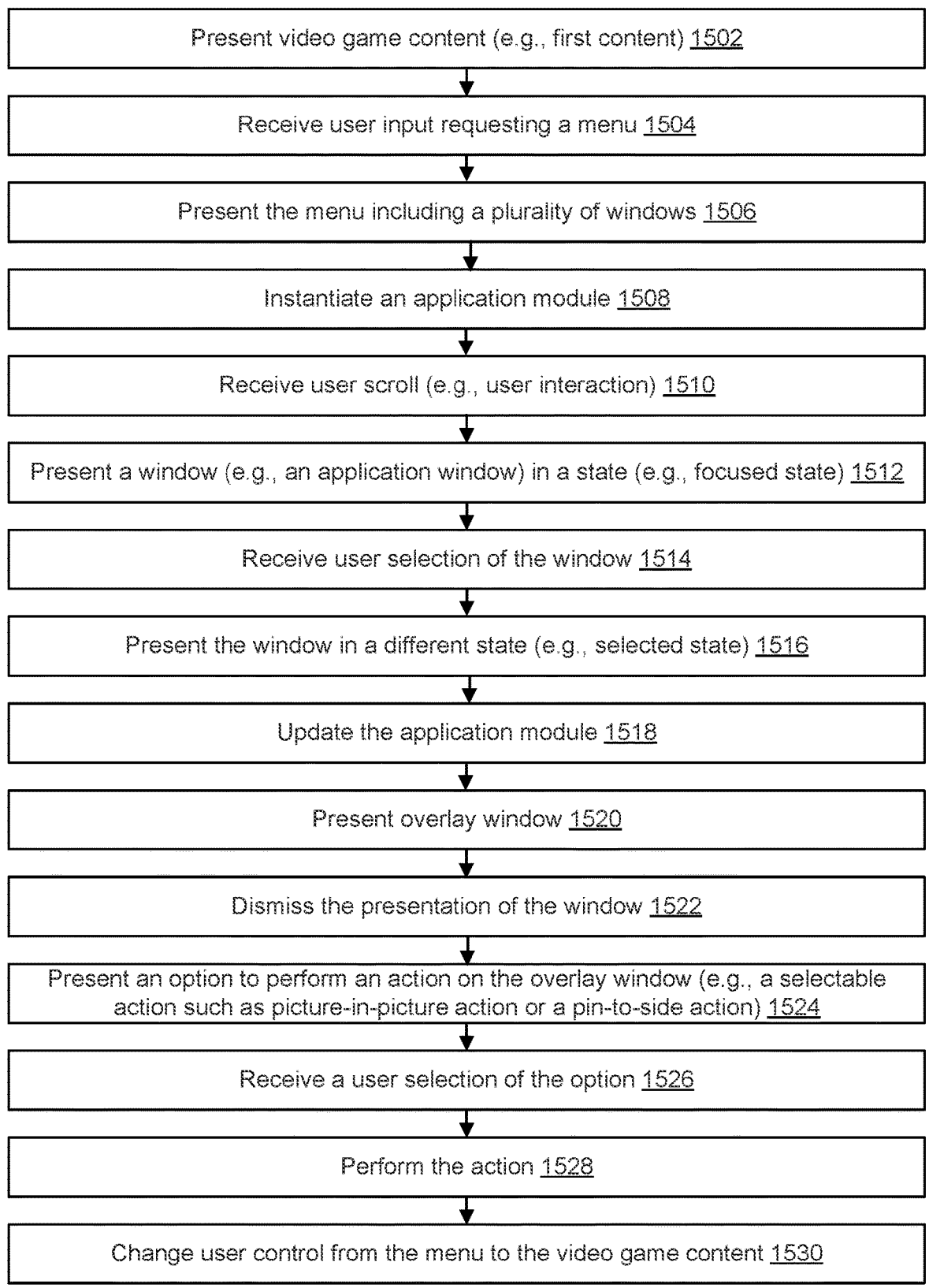
FIG. 15 illustrates an example flow for launching an application module and terminating a menu application, according to embodiments of the present disclosure.

FIG. 15 illustrates an example flow for launching an application module and terminating a menu application, according to embodiments of the present disclosure. The operations of the flow can be implemented as hardware circuitry and/or stored as computer-readable instructions on a non-transitory computer-readable medium of a computer system, such as a video game system. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered. The example flow of FIG. 15 can be performed in conjunction or independent of the examples flows of FIGS. 11-13.

In an example, the flow includes an operation 1502, where the computer system presents video content of a video game application (e.g., first content of a first application) on a display. The video game application can be executed on the computer system and the video game content can be presented based on the game play of a user of the computer system (e.g., a video game player).

In an example, the flow includes an operation 1504, where the computer system receives user input requesting a menu. For instance, the user input is received from an input device (e.g., a video game controller) and corresponds to a user push of a key or button on the input device (e.g., a particular video game controller button) or any other type of input (e.g., a mouse click). An event may be generated from the user input indicating a command. The command can be for the presentation of the menu. Otherwise, the command can be for other controls (e.g., the display of a home user interface, an exit from the video game application, etc.) depending on the type of the user input.

In an example, the flow includes an operation 1506, where the computer system presents the menu, where this menu is a context-based menu that includes a plurality of windows (e.g., action cards) displayed in a dynamic area of the menu and a plurality of icons displayed in a static area of the menu. For instance, the menu is presented in response to the command for the presentation of the menu. In addition, a user context and an application context can be determined and used to select particular application or remote computing services that are likely of interest to the user. Each window within the dynamic menu area corresponds to one of these applications. The windows can also be presented in a glanced state. In one illustration, the window of likely most interest to the user given the user context and application context can be shown in another state (e.g., the focused state). In another illustration, if one of the windows was selected or was in a focused state upon the most previous dismissal of the menu, that window can be presented in the focused state.

In an example, the flow includes an operation 1508, where the computer system instantiates an application module. The application module can have parameters common to the different applications that correspond to the windows of the menu.

In an example, the flow includes an operation 1510, where the computer system receives a user scroll through the windows within the dynamic menu area (or any other types of interactions within the dynamic menu area indicating a focus of the user). The user scroll can be received based on user input from the input device and a relevant event can be generated based on this input.

In an example, the flow includes an operation 1512, where the computer system presents a window (e.g., an application window corresponding to one of the applications where the user focus is currently on) in the other state (e.g. the focused state). For instance, if the user scroll is over the window, that window is presented in the focused state, while the presentation of the remaining windows is in the glanced state.

In an example, the flow includes an operation 1514, where the computer system receives a user selection of the window. The user selection can be received based on user input from the input device and while the window is presented in the focused state. A relevant event can be generated based on this input.

In an example, the flow includes an operation 1516, where the computer system presents the window in a different state (e.g. a selected state). For instance, the window's size is changed from the focused state to the selected state, while the presentation of the remaining windows remains in the glanced state.

In an example, the flow includes an operation 1518, where the computer system updates the application module to include parameters specific to the corresponding application of the selected window and to present an overlay window. For instance, the size, content, and actions of the window and the state information and programming logic of the application are passed to the application window, thereby launching an instance of the application from the application module, where this instance can use the information about the size, content, and actions of the window for the presentation of the overlay window.

In an example, the flow includes an operation 1520, where the computer system presents the overlay window. For instance, as the window transitions from the focused state to the selected state or once in the selected state, a rendering process also presents the overlay window over the window.

In an example, the flow includes an operation 1522, where the computer system dismisses the presentation of the window. For instance, upon the presentation of the overlay window or upon the transition to the selected state, the window is closed. In addition, the menu application can be termination or can be moved to the background.

In an example, the flow includes an operation 1524, where the computer system presents an option to perform an action (e.g., a selectable action) on the overlay window (e.g., to pin to side or to show as a picture in picture). For instance, the option is presented as an icon within the overlay window upon the transition to the selected state.

In an example, the flow includes an operation 1526, where the computer system receives a user selection of the option. The user selection can be received based on user input from the input device and a relevant event can be generated based on this input.

In an example, the flow includes an operation 1528, where the computer system performs the action. For instance, a pin-to-side operation or a picture-in-picture operation are performed on the overlay window, resulting in a pinned window or a picture-in-picture window.

In an example, the flow includes an operation 1530, where the computer system changes user control from the menu to the video game content. For instance, the presentation of the menu is dismissed, while the presentation of the content continues in the pinned window or the picture-in-picture window. User input received subsequently can be used to control the video game application or to request the menu again. In an illustration, a subset of the buttons, keys, or gestures on the input device are mapped to and usable for controlling the video game application, while another subset of the buttons, keys, or gestures are mapped to and usable for controlling the pinned window or picture-in-picture window. In this way, the user can have simultaneous control over both the video game application and the other application (that interfaces with the user through the pinned window or picture-in-picture window) depending on the buttons on the input device.

Figure 16:
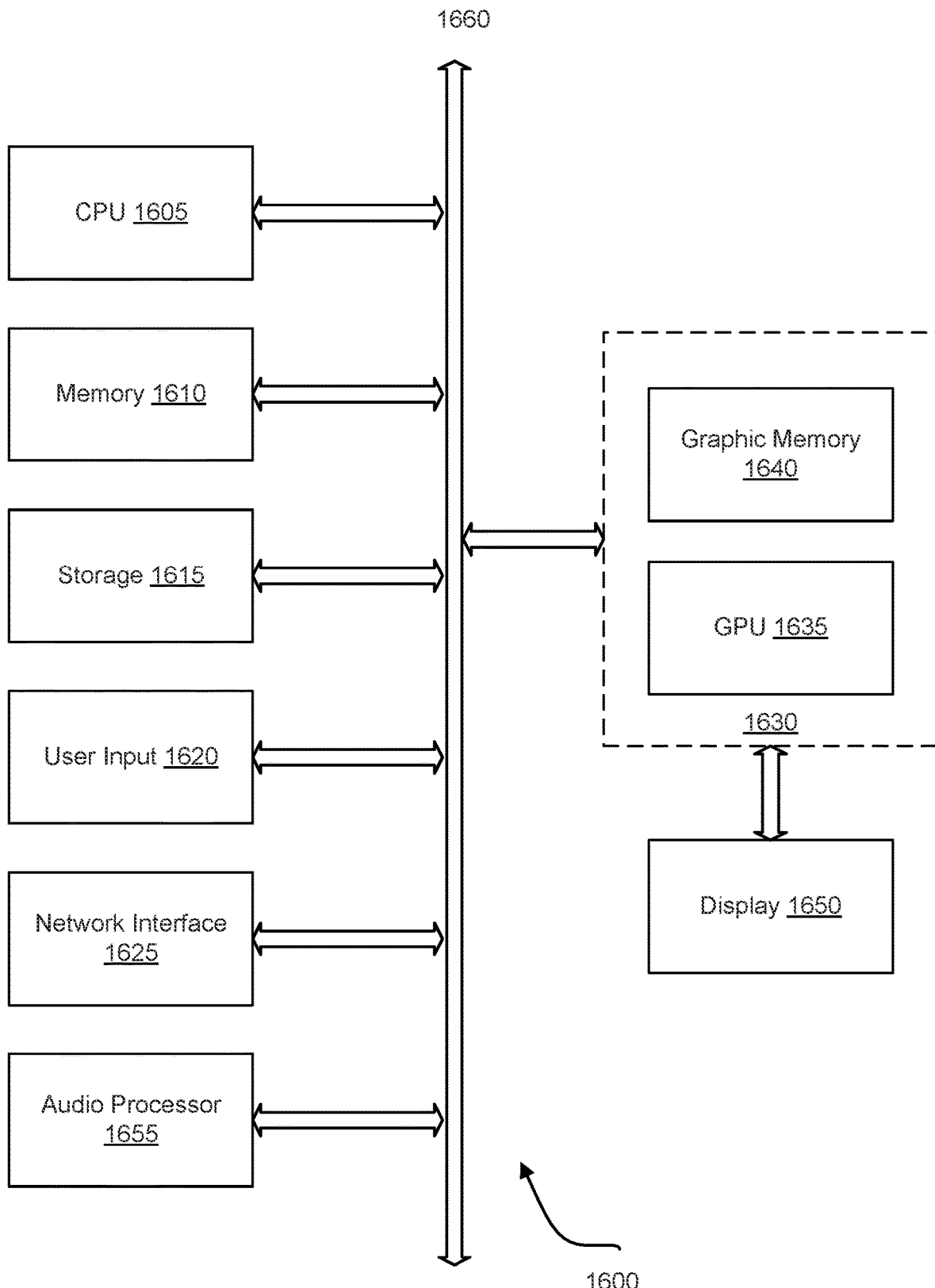
FIG. 16 illustrates an example of a hardware system suitable for implementing a computer system, according to embodiments of the present disclosure.

FIG. 16 illustrates an example of a hardware system suitable for implementing a computer system 1600, according to embodiments of the present disclosure. The computer system 1600 represents, for example, a video game system, a backend set of servers, or other types of a computer system. The computer system 1600 includes a central processing unit (CPU) 1605 for running software applications and optionally an operating system. The CPU 1605 may be made up of one or more homogeneous or heterogeneous processing cores. Memory 1610 stores applications and data for use by the CPU 1605. Storage 1615 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1620 communicate user inputs from one or more users to the computer system 1600, examples of which may include keyboards, mice, joysticks, touch pads, touch screens, still or video cameras, and/or microphones. Network interface 1625 allows the computer system 1600 to communicate with other computer systems via an electronic communications network, and may include wired or wireless communication over local area networks and wide area networks such as the Internet. An audio processor 1655 is adapted to generate analog or digital audio output from instructions and/or data provided by the CPU 1605, memory 1610, and/or storage 1615. The components of computer system 1600, including the CPU 1605, memory 1610, data storage 1615, user input devices 1620, network interface 1625, and audio processor 1655 are connected via one or more data buses 1660.

A graphics subsystem 1630 is further connected with the data bus 1660 and the components of the computer system 1600. The graphics subsystem 1630 includes a graphics processing unit (GPU) 1635 and graphics memory 1640. The graphics memory 1640 includes a display memory (e.g., a frame buffer) used for storing pixel data for each pixel of an output image. The graphics memory 1640 can be integrated in the same device as the GPU 1635, connected as a separate device with the GPU 1635, and/or implemented within the memory 1610. Pixel data can be provided to the graphics memory 1640 directly from the CPU 1605. Alternatively, the CPU 1605 provides the GPU 1635 with data and/or instructions defining the desired output images, from which the GPU 1635 generates the pixel data of one or more output images. The data and/or instructions defining the desired output images can be stored in the memory 1610 and/or graphics memory 1640. In an embodiment, the GPU 1635 includes 3D rendering capabilities for generating pixel data for output images from instructions and data defining the geometry, lighting, shading, texturing, motion, and/or camera parameters for a scene. The GPU 1635 can further include one or more programmable execution units capable of executing shader programs.

The graphics subsystem 1630 periodically outputs pixel data for an image from the graphics memory 1640 to be displayed on the display device 1650. The display device 1650 can be any device capable of displaying visual information in response to a signal from the computer system 1600, including CRT, LCD, plasma, and OLED displays. The computer system 1600 can provide the display device 1650 with an analog or digital signal.

In accordance with various embodiments, the CPU 1605 is one or more general-purpose microprocessors having one or more processing cores. Further embodiments can be implemented using one or more CPUs 1605 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly.

Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 165%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of presenting a menu on a computer system, the method comprising:
    presenting, on a display communicatively coupled with the computer system, a menu based on an execution of a menu application, wherein the menu comprises a plurality of application windows, each of the plurality of application windows corresponds to a different application of the computer system and is presented in a glanced state with content of a corresponding application;
    instantiating, based on the presentation of the menu, an application module that has parameters common to the different applications;
    presenting, on the display, a window in a focused state based on a user interaction;
    presenting, on the display, the window in a selected state based on a user selection of the window, wherein the window and the content are resized in the selected state and wherein the window includes one or more selectable controls;
    updating, based on the window being in the selected state, the application module to include parameters specific to the corresponding application and to present an overlay window reproducing the window in the selected state; and
    presenting, on the display, the overlay window coextensive with and over the window in the selected state, the overlay window comprising the content.

2. The method of claim 1, further comprising:
    dismissing, by terminating the execution of the menu application, the presentation of the window based on the presentation of the overlay window.

3. The method of claim 1, wherein the presentation of the window in the selected state comprises a first presentation of a selectable action as being performable on the window, and wherein the presentation of the overlay window comprises a second presentation of the selectable action as being performable on the overlay window.

4. The method of claim 3, wherein the selectable action is a picture-in-picture action, and further comprising:
    presenting, on the display, video game content of a video game application executed on the computer system;
    receiving a user selection of the selectable action; and
    presenting the content of the corresponding application as a picture-in-picture within the video game content.

5. The method of claim 3, wherein the selectable action is a pin-to-side action, and further comprising:
    presenting, on the display, video game content of a video game application executed on the computer system;
    receiving a user selection of the selectable action; and
    presenting the overlay window as a pinned window adjacent to the video game content.

6. The method of claim 3, further comprising:
presenting, on the display, video game content of a video game application executed on the computer system;
receiving a user selection of the selectable action;
performing the selectable action on the overlay window while the execution of the video game application and the presentation of the video game content continue; and
changing, upon performing the selectable action, user control from the overlay window to the video game content, wherein the menu is presented in a layer over the video game content in response to user input requesting the menu.

7. The method of claim 6, further comprising:
presenting, in the layer, a plurality of windows of the menu in the glanced state, the plurality of windows comprising the window;
receiving a user scroll through the plurality of windows; and
presenting, in the layer, the window in the focused state based on the user scroll being over the window.

8. A non-transitory computer-readable storage medium comprising instructions that, upon execution on a computer system, cause the computer system to perform operations comprising:
presenting, on a display communicatively coupled with the computer system, a menu based on an execution of a menu application, wherein the menu comprises a plurality of application windows, each of the plurality of application windows corresponds to a different application of the computer system and is presented in a glanced state with content of a corresponding application;
instantiating, based on the presentation of the menu, an application module that has parameters common to the different applications;
presenting, on the display, a window in a focused state based on a user interaction;
presenting, on the display, the window in a selected state based on a user selection of the window, wherein the window and the content are resized in the selected state and wherein the window includes one or more selectable controls; updating, based on the window being in the selected state, the application module to include parameters specific to the corresponding application and to present an overlay window reproducing the window in the selected state; and
presenting, on the display, the overlay window coextensive with and over the window in the selected state, the overlay window comprising the content.

9. The medium of claim 8, wherein the operations further comprise:
dismissing, by terminating the execution of the menu application, the presentation of the window based on the presentation of the overlay window.

10. The medium of claim 8, wherein the presentation of the window in the selected state comprises a first presentation of a selectable action as being performable on the window, and wherein the presentation of the overlay window comprises a second presentation of the selectable action as being performable on the overlay window.

11. The medium of claim 10, wherein the selectable action is a picture-in-picture action, and the instructions further comprise:
presenting, on the display, video game content of a video game application executed on the computer system;
receiving a user selection of the selectable action; and
presenting the content of the corresponding application as a picture-in-picture within the video game content.

12. The medium of claim 10, wherein the selectable action is a pin-to-side action, and the instructions further comprise:
presenting, on the display, video game content of a video game application executed on the computer system;
receiving a user selection of the selectable action; and
presenting the overlay window as a pinned window adjacent to the video game content.

13. The medium of claim 10, wherein the operations further comprise:
presenting, on the display, video game content of a video game application executed on the computer system;
receiving a user selection of the selectable action;
performing the selectable action on the overlay window while the execution of the video game application and the presentation of the video game content continue; and
changing, upon performing the selectable action, user control from the overlay window to the video game content, wherein the menu is presented in a layer over the video game content in response to user input requesting the menu.

14. The medium of claim 13, wherein the operations further comprise:
presenting, in the layer, a plurality of windows of the menu in the glanced state, the plurality of windows comprising the window;
receiving a user scroll through the plurality of windows; and
presenting, in the layer, the window in the focused state based on the user scroll being over the window.

15. A computer system comprising:
a processor; and
a memory storing computer-readable instructions that, upon execution by the processor, cause the computer system to perform operations comprising:
presenting, on a display communicatively coupled with the computer system, a menu based on an execution of a menu application, wherein the menu comprises a plurality of application windows, each of the plurality of application windows corresponds to a different application of the computer systems and is presented in a glanced state with content of a corresponding application;
instantiating, based on the presentation of the menu, an application module that has parameters common to the different applications;
presenting, on the display, a window in a focused state based on a user interaction;
presenting, on the display, the window in a selected state based on a user selection of the window, wherein the window includes one or more selectable controls;
updating, based on the window being in the selected state, the application module to include parameters specific to the corresponding application and to present an overlay window reproducing the window in the selected state; and
presenting, on the display, the overlay window coextensive with and over the window in the selected state, the overlay window comprising the content.

16. The system of claim 15, wherein the operations further comprise:
dismissing, by terminating the execution of the menu application, the presentation of the window based on the presentation of the overlay window.

17. The system of claim 15, wherein the presentation of the window in the selected state comprises a first presentation of a selectable action as being performable on the window, and wherein the presentation of the overlay window comprises a second presentation of the selectable action as being performable on the overlay window.

18. The system of claim 17, wherein the selectable action is a picture-in-picture action, and further comprising:
   presenting, on the display, video game content of a video game application executed on the computer system;
   receiving a user selection of the selectable action; and
   presenting the content of the corresponding application as a picture-in-picture within the video game content.

19. The system of claim 17, wherein the selectable action is a pin-to-side action, and further comprising:
   presenting, on the display, video game content of a video game application executed on the computer system;
   receiving a user selection of the selectable action; and
   presenting the overlay window as a pinned window adjacent to the video game content.

20. The system of claim 17, wherein the operations further comprise:
   presenting, on the display, video game content of a video game application executed on the computer system;
   receiving a user selection of the selectable action;
   performing the selectable action on the overlay window while the execution of the video game application and the presentation of the video game content continue; and
   changing, upon performing the selectable action, user control from the overlay window to the video game content, wherein the menu is presented in a layer over the video game content in response to user input requesting the menu.

21. The system of claim 20, the operations further comprising:
   presenting, in the layer, a plurality of windows of the menu in the glanced state, the plurality of windows comprising the window;
   receiving a user scroll through the plurality of windows; and
   presenting, in the layer, the window in the focused state based on the user scroll being over the window.

* * * * *